United States Patent
Lin et al.

(10) Patent No.: US 12,366,732 B2
(45) Date of Patent: Jul. 22, 2025

(54) OPTICAL IMAGING LENS

(71) Applicant: GENIUS ELECTRONIC OPTICAL (XIAMEN) CO., LTD., Fujian (CN)

(72) Inventors: Hai Lin, Fujian (CN); Songchao Huang, Fujian (CN); Jiayuan Zhang, Fujian (CN); Hung-Chien Hsieh, Fujian (CN)

(73) Assignee: GENIUS ELECTRONIC OPTICAL (XIAMEN) CO., LTD., Fujian (CN)

( * ) Notice: Subject to any disclaimer, the term of this patent is extended or adjusted under 35 U.S.C. 154(b) by 532 days.

(21) Appl. No.: 17/835,980

(22) Filed: Jun. 9, 2022

(65) Prior Publication Data
US 2023/0204920 A1 Jun. 29, 2023

(30) Foreign Application Priority Data
Dec. 28, 2021 (CN) .......................... 202111624102.7

(51) Int. Cl.
*G02B 13/00* (2006.01)
*G02B 9/64* (2006.01)

(52) U.S. Cl.
CPC .......... *G02B 13/0045* (2013.01); *G02B 9/64* (2013.01)

(58) Field of Classification Search
None
See application file for complete search history.

(56) References Cited

U.S. PATENT DOCUMENTS

| 2019/0056568 A1 | 2/2019 | Huang |
| 2021/0364754 A1 | 11/2021 | You et al. |
| 2022/0137347 A1* | 5/2022 | Si .................. G02B 27/0012 359/708 |
| 2023/0204910 A1* | 6/2023 | Zhang .................. G02B 1/041 359/754 |
| 2023/0204911 A1* | 6/2023 | Jhang .................. G02B 1/041 359/692 |

(Continued)

FOREIGN PATENT DOCUMENTS

| CN | 108681040 | 10/2018 |
| CN | 110471168 | 11/2019 |

(Continued)

OTHER PUBLICATIONS

"Office Action of China Counterpart Application", issued on Feb. 21, 2024, p. 1-p. 7.

*Primary Examiner* — Ryan Crockett
(74) *Attorney, Agent, or Firm* — JCIPRNET

(57) ABSTRACT

Provided is an optical imaging lens, including a first lens element, a second lens element, a third lens element, a fourth lens element, a fifth lens element, a sixth lens element, a seventh lens element, and an eighth lens element sequentially arranged along an optical axis from an object side to an image side. The first lens element has positive refracting power. A periphery region of the object-side surface of the second lens element is convex. The third lens element has positive refracting power. A periphery region of the image-side surface of the third lens element is concave. An optical axis region of the image-side surface of the fifth lens element is concave. An optical axis region of the image-side surface of the sixth lens element is convex. A periphery region of the object-side surface of the eighth lens element is convex.

20 Claims, 28 Drawing Sheets

(56) References Cited

U.S. PATENT DOCUMENTS

| | | | | |
|---|---|---|---|---|
| 2023/0204912 A1* | 6/2023 | Liao | ............ | G02B 13/0045 359/692 |
| 2023/0204913 A1* | 6/2023 | Zhang | ............ | G02B 9/64 359/754 |
| 2023/0204914 A1* | 6/2023 | Jhang | ............ | G02B 9/64 359/692 |
| 2023/0204915 A1* | 6/2023 | Lin | ............ | G02B 13/0045 359/692 |
| 2023/0204917 A1* | 6/2023 | Kao | ............ | G02B 9/64 359/708 |
| 2023/0204918 A1* | 6/2023 | Kao | ............ | G02B 13/006 359/708 |
| 2023/0204919 A1* | 6/2023 | Liao | ............ | G02B 9/64 359/692 |
| 2023/0204921 A1* | 6/2023 | Zhang | ............ | G02B 9/64 359/708 |
| 2023/0204922 A1* | 6/2023 | Dong | ............ | G02B 13/0045 359/708 |
| 2023/0204923 A1* | 6/2023 | Jhang | ............ | G02B 13/0045 359/708 |
| 2023/0221524 A1* | 7/2023 | Jhang | ............ | G02B 13/0045 359/692 |
| 2023/0221526 A1* | 7/2023 | Dong | ............ | G02B 9/64 359/692 |
| 2023/0221527 A1* | 7/2023 | Jhang | ............ | G02B 9/64 359/692 |
| 2023/0221529 A1* | 7/2023 | Zhu | ............ | G02B 13/0045 359/692 |
| 2023/0221530 A1* | 7/2023 | Zhu | ............ | G02B 13/0045 359/692 |
| 2023/0221533 A1* | 7/2023 | Dong | ............ | G02B 13/0045 359/754 |
| 2023/0236392 A1* | 7/2023 | Zhang | ............ | G02B 13/0045 359/754 |
| 2024/0210658 A1* | 6/2024 | Jang | ............ | G02B 13/0045 |
| 2024/0402468 A1* | 12/2024 | Jung | ............ | G02B 13/0045 |
| 2025/0020893 A1* | 1/2025 | Jhang | ............ | G02B 13/0045 |

FOREIGN PATENT DOCUMENTS

| | | | | |
|---|---|---|---|---|
| CN | 110908081 | | 3/2020 | |
| CN | 111007627 | | 4/2020 | |
| CN | 111007627 A | * | 4/2020 | ......... G02B 13/0045 |
| CN | 111061042 | | 4/2020 | |
| CN | 112230372 | | 1/2021 | |
| CN | 113341540 | | 9/2021 | |
| JP | 6463591 | | 2/2019 | |

* cited by examiner

| First embodiment |||||||
|---|---|---|---|---|---|---|
| EFL= 8.032 mm, HFOV= 37.312°, TTL= 9.317 mm, Fno= 1.700, ImgH= 7.300 mm |||||||
| Device | Surface | Radius of curvature (mm) | Distance (mm) | Refractive index | Abbe number | Focal length (mm) |
| Object | | Infinity | Infinity | | | |
| Aperture 0 | | Infinity | -0.925 | | | |
| First lens element 1 | Object-side surface 15 | 3.328 | 1.131 | 1.545 | 55.987 | 7.523 |
| | Image-side surface 16 | 15.403 | 0.184 | | | |
| Second lens element 2 | Object-side surface 25 | 8.417 | 0.233 | 1.671 | 19.480 | -13.876 |
| | Image-side surface 26 | 4.391 | 0.416 | | | |
| Third lens element 3 | Object-side surface 35 | 5.432 | 0.715 | 1.545 | 55.987 | 19.714 |
| | Image-side surface 36 | 10.450 | 0.790 | | | |
| Fourth lens element 4 | Object-side surface 45 | 308.982 | 0.532 | 1.671 | 19.480 | 111.737 |
| | Image-side surface 46 | -100.202 | 0.486 | | | |
| Fifth lens element 5 | Object-side surface 55 | 14.147 | 0.352 | 1.545 | 55.987 | 1507.837 |
| | Image-side surface 56 | 14.268 | 0.714 | | | |
| Sixth lens element 6 | Object-side surface 65 | 76.531 | 0.532 | 1.671 | 19.480 | 104.948 |
| | Image-side surface 66 | -1000.000 | 0.315 | | | |
| Seventh lens element 7 | Object-side surface 75 | 5.047 | 0.757 | 1.545 | 55.987 | -221.597 |
| | Image-side surface 76 | 4.588 | 1.350 | | | |
| Eighth lens element 8 | Object-side surface 85 | -4.863 | 0.200 | 1.545 | 55.987 | -9.041 |
| | Image-side surface 86 | -320.732 | 0.250 | | | |
| Filter 9 | Object-side surface 95 | Infinity | 0.339 | 1.563 | 51.300 | |
| | Image-side surface 96 | Infinity | 0.020 | | | |
| | Image plane 99 | Infinity | | | | |

FIG. 8

| Surface | K | $a_4$ | $a_6$ | $a_8$ | $a_{10}$ |
|---|---|---|---|---|---|
| 15 | -1.339526E-01 | 2.222155E-04 | -7.891214E-05 | 4.976594E-05 | -3.814942E-05 |
| 16 | -7.510290E+00 | 3.241028E-03 | -1.131052E-03 | 2.153511E-05 | 9.859775E-05 |
| 25 | -3.052906E+00 | 1.972630E-03 | -8.381085E-04 | 2.728584E-04 | 3.071542E-05 |
| 26 | 6.911809E-01 | -1.517594E-03 | 8.935774E-04 | -1.951917E-04 | 2.517414E-04 |
| 35 | -6.073316E-01 | -7.319162E-04 | 1.247437E-03 | -7.149394E-04 | 4.407971E-04 |
| 36 | -3.315139E+00 | -1.027323E-03 | -9.301422E-04 | 8.195977E-04 | -4.619771E-04 |
| 45 | 0.000000E+00 | -4.826146E-03 | -3.608743E-03 | 1.635076E-03 | -6.654003E-04 |
| 46 | 0.000000E+00 | -2.911957E-03 | -6.728997E-03 | 4.934174E-03 | -2.952267E-03 |
| 55 | -3.809881E+01 | -4.438981E-03 | -4.881933E-03 | 1.704959E-03 | -1.175610E-04 |
| 56 | 0.000000E+00 | -7.578371E-03 | -3.975603E-03 | 1.665533E-03 | -3.156282E-04 |
| 65 | -2.339754E-01 | 8.746339E-04 | -3.826978E-03 | -1.580784E-04 | 2.698516E-04 |
| 66 | -3.345142E-06 | 3.151036E-04 | -8.566602E-04 | -1.308634E-03 | 6.461584E-04 |
| 75 | -1.681815E+01 | -6.105857E-03 | -3.253030E-04 | -4.137448E-04 | 2.049466E-04 |
| 76 | -1.511712E+01 | 1.384050E-03 | -2.457089E-03 | 5.162575E-04 | -6.035338E-05 |
| 85 | -4.901397E-01 | 8.049045E-04 | 3.613592E-05 | 7.406259E-06 | -2.805558E-07 |
| 86 | 0.000000E+00 | -3.507855E-03 | 8.002173E-06 | 4.250780E-05 | -6.333917E-06 |
| Surface | $a_{12}$ | $a_{14}$ | $a_{16}$ | $a_{18}$ | $a_{20}$ |
| 15 | 1.139716E-05 | -1.832985E-06 | 1.088665E-07 | | |
| 16 | -3.624731E-05 | 5.498563E-06 | -3.061922E-07 | | |
| 25 | -3.706144E-05 | 8.485830E-06 | -6.421259E-07 | | |
| 26 | -1.191105E-04 | 2.537038E-05 | -2.129855E-06 | | |
| 35 | -1.426060E-04 | 2.436781E-05 | -1.724609E-06 | | |
| 36 | 1.453306E-04 | -2.351971E-05 | 1.489701E-06 | | |
| 45 | 1.420029E-04 | -1.557534E-05 | 3.995164E-07 | | |
| 46 | 1.180448E-03 | -3.120207E-04 | 5.184475E-05 | -4.897501E-06 | 1.993649E-07 |
| 55 | -2.208646E-04 | 9.696435E-05 | -1.920363E-05 | 1.918716E-06 | -7.897783E-08 |
| 56 | -2.066675E-05 | 1.908791E-05 | -3.409517E-06 | 2.727295E-07 | -8.292179E-09 |
| 65 | -5.581379E-05 | 1.432390E-06 | 8.777086E-07 | -1.109158E-07 | 3.967873E-09 |
| 66 | -1.493000E-04 | 1.960198E-05 | -1.486265E-06 | 6.048445E-08 | -1.020438E-09 |
| 75 | -4.082964E-05 | 4.331212E-06 | -2.565501E-07 | 7.980334E-09 | -1.009900E-10 |
| 76 | 4.328848E-06 | -1.944322E-07 | 5.327409E-09 | -8.125800E-11 | 5.260000E-13 |
| 85 | -1.796141E-08 | 1.624730E-09 | -4.968100E-11 | 7.030000E-13 | -4.000000E-15 |
| 86 | 4.622811E-07 | -1.930381E-08 | 4.701220E-10 | -6.216000E-12 | 3.400000E-14 |

FIG. 9

| Second embodiment ||||||
|---|---|---|---|---|---|
| EFL= 8.138 mm, HFOV= 37.511°, TTL= 9.323 mm, Fno= 1.700, ImgH= 7.300 mm ||||||
| Device | Surface | Radius of curvature (mm) | Distance (mm) | Refractive index | Abbe number | Focal length (mm) |
| Object | | Infinity | Infinity | | | |
| Aperture 0 | | Infinity | -0.964 | | | |
| First lens element 1 | Object-side surface 15 | 3.299 | 1.133 | 1.545 | 55.987 | 7.554 |
| | Image-side surface 16 | 14.461 | 0.184 | | | |
| Second lens element 2 | Object-side surface 25 | 8.166 | 0.236 | 1.671 | 19.480 | -14.019 |
| | Image-side surface 26 | 4.340 | 0.417 | | | |
| Third lens element 3 | Object-side surface 35 | 5.416 | 0.663 | 1.545 | 55.987 | 19.875 |
| | Image-side surface 36 | 10.339 | 0.794 | | | |
| Fourth lens element 4 | Object-side surface 45 | 187.827 | 0.526 | 1.671 | 19.480 | 98.778 |
| | Image-side surface 46 | -103.851 | 0.509 | | | |
| Fifth lens element 5 | Object-side surface 55 | 14.114 | 0.343 | 1.545 | 55.987 | -212.394 |
| | Image-side surface 56 | 12.475 | 0.696 | | | |
| Sixth lens element 6 | Object-side surface 65 | 189.365 | 0.513 | 1.671 | 19.480 | 235.039 |
| | Image-side surface 66 | -1000.000 | 0.264 | | | |
| Seventh lens element 7 | Object-side surface 75 | 5.245 | 0.728 | 1.545 | 55.987 | 50.595 |
| | Image-side surface 76 | 6.155 | 1.300 | | | |
| Eighth lens element 8 | Object-side surface 85 | -4.878 | 0.200 | 1.545 | 55.987 | -8.456 |
| | Image-side surface 86 | 88.375 | 0.250 | | | |
| Filter 9 | Object-side surface 95 | Infinity | 0.339 | 1.563 | 51.300 | |
| | Image-side surface 96 | Infinity | 0.225 | | | |
| | Image plane 99 | Infinity | | | | |

FIG. 12

| Surface | K | $a_4$ | $a_6$ | $a_8$ | $a_{10}$ |
|---|---|---|---|---|---|
| 15 | -1.331352E-01 | 1.459356E-04 | 6.747052E-06 | -1.215102E-05 | -1.250079E-05 |
| 16 | -7.405382E+00 | 3.220315E-03 | -1.254107E-03 | 1.063896E-04 | 7.543505E-05 |
| 25 | -3.147545E+00 | 2.612446E-03 | -1.600812E-03 | 6.494336E-04 | -6.918820E-05 |
| 26 | 6.857600E-01 | -6.343437E-04 | 8.236924E-05 | 1.200974E-04 | 1.930979E-04 |
| 35 | -5.898030E-01 | -4.029512E-04 | 1.142296E-03 | -7.492859E-04 | 4.590427E-04 |
| 36 | -3.660888E+00 | -7.684148E-04 | -1.298097E-03 | 1.171943E-03 | -6.814134E-04 |
| 45 | 0.000000E+00 | -4.889545E-03 | -3.158176E-03 | 1.222848E-03 | -4.813158E-04 |
| 46 | 0.000000E+00 | -2.882747E-03 | -6.312479E-03 | 4.788414E-03 | -3.043105E-03 |
| 55 | -4.578600E+01 | -4.857027E-03 | -4.500809E-03 | 1.690957E-03 | -1.366337E-04 |
| 56 | 0.000000E+00 | -7.763432E-03 | -4.112982E-03 | 2.232925E-03 | -6.979585E-04 |
| 65 | -3.859131E-02 | 1.704070E-03 | -4.266198E-03 | 2.465025E-04 | 2.194771E-04 |
| 66 | -7.446283E-05 | -1.675724E-03 | -1.906604E-03 | -7.699232E-05 | 1.936599E-04 |
| 75 | -1.831221E+01 | -6.268938E-03 | -1.575503E-03 | 2.823384E-04 | 1.911294E-05 |
| 76 | -2.220501E+01 | 1.352414E-04 | -2.070037E-03 | 4.322533E-04 | -4.958760E-05 |
| 85 | -4.897167E-01 | 4.119792E-04 | 2.004676E-04 | -1.996294E-05 | 2.320105E-06 |
| 86 | 0.000000E+00 | -2.507144E-03 | -2.800636E-04 | 7.659702E-05 | -8.682187E-06 |
| Surface | $a_{12}$ | $a_{14}$ | $a_{16}$ | $a_{18}$ | $a_{20}$ |
| 15 | 5.526053E-06 | -1.112012E-06 | 7.177264E-08 | | |
| 16 | -3.256037E-05 | 5.150459E-06 | -2.925146E-07 | | |
| 25 | -2.136180E-05 | 7.093412E-06 | -5.923382E-07 | | |
| 26 | -1.174057E-04 | 2.667352E-05 | -2.297250E-06 | | |
| 35 | -1.448981E-04 | 2.424189E-05 | -1.678657E-06 | | |
| 36 | 2.194810E-04 | -3.639203E-05 | 2.401506E-06 | | |
| 45 | 9.789764E-05 | -1.043948E-05 | 1.842791E-07 | | |
| 46 | 1.275775E-03 | -3.485781E-04 | 5.918749E-05 | -5.667963E-06 | 2.329614E-07 |
| 55 | -2.468426E-04 | 1.162085E-04 | -2.422488E-05 | 2.505589E-06 | -1.048707E-07 |
| 56 | 1.047069E-04 | -3.638306E-06 | -1.123355E-06 | 1.565231E-07 | -6.111078E-09 |
| 65 | -9.211757E-05 | 1.608271E-05 | -1.412359E-06 | 5.770049E-08 | -8.700780E-10 |
| 66 | -6.187967E-05 | 9.776722E-06 | -8.434618E-07 | 3.796817E-08 | -6.985570E-10 |
| 75 | -1.235817E-05 | 1.718996E-06 | -1.152334E-07 | 3.831529E-09 | -4.998800E-11 |
| 76 | 3.428175E-06 | -1.443998E-07 | 3.517373E-09 | -4.225000E-11 | 1.450000E-13 |
| 85 | -1.707126E-07 | 7.270283E-09 | -1.774520E-10 | 2.318000E-12 | -1.300000E-14 |
| 86 | 5.664693E-07 | -2.236135E-08 | 5.275340E-10 | -6.837000E-12 | 3.700000E-14 |

FIG. 13

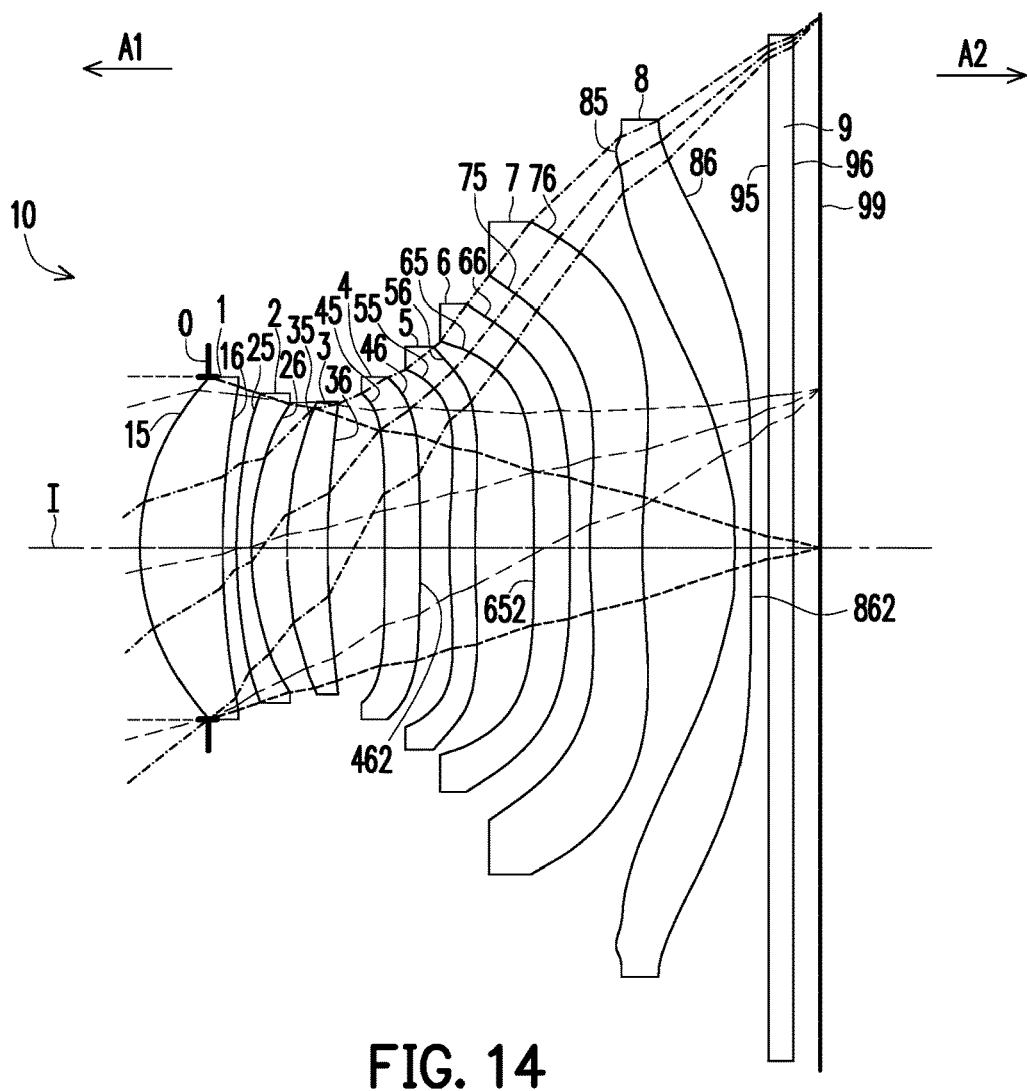
FIG. 14
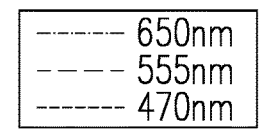
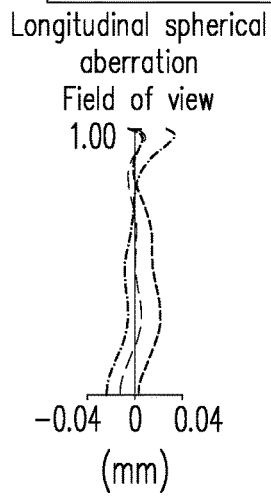
Longitudinal spherical aberration
Field of view
FIG. 15A
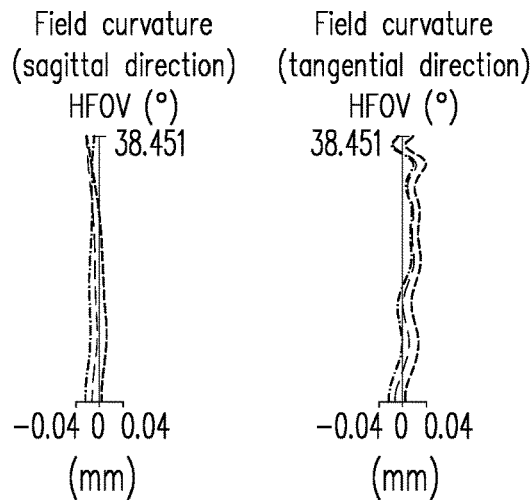
Field curvature (sagittal direction) HFOV (°)
FIG. 15B
Field curvature (tangential direction) HFOV (°)
FIG. 15C
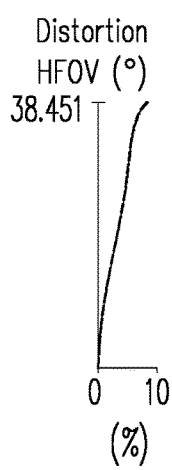
Distortion HFOV (°)
FIG. 15D

| Third embodiment | | | | | | |
|---|---|---|---|---|---|---|
| EFL= 8.466 mm, HFOV= 38.451°, TTL= 9.443 mm, Fno= 1.800, ImgH= 7.300 mm | | | | | | |
| Device | Surface | Radius of curvature (mm) | Distance (mm) | Refractive index | Abbe number | Focal length (mm) |
| Object | | Infinity | Infinity | | | |
| Aperture 0 | | Infinity | -0.951 | | | |
| First lens element 1 | Object-side surface 15 | 3.238 | 1.141 | 1.545 | 55.987 | 7.832 |
| | Image-side surface 16 | 11.656 | 0.191 | | | |
| Second lens element 2 | Object-side surface 25 | 7.298 | 0.205 | 1.671 | 19.480 | -15.422 |
| | Image-side surface 26 | 4.248 | 0.501 | | | |
| Third lens element 3 | Object-side surface 35 | 5.447 | 0.565 | 1.545 | 55.987 | 19.671 |
| | Image-side surface 36 | 10.642 | 0.796 | | | |
| Fourth lens element 4 | Object-side surface 45 | 207.401 | 0.481 | 1.671 | 19.480 | -359.694 |
| | Image-side surface 46 | 111.940 | 0.423 | | | |
| Fifth lens element 5 | Object-side surface 55 | 11.150 | 0.345 | 1.545 | 55.987 | 73.002 |
| | Image-side surface 56 | 15.308 | 0.818 | | | |
| Sixth lens element 6 | Object-side surface 65 | -44.699 | 0.500 | 1.671 | 19.480 | 319.030 |
| | Image-side surface 66 | -37.207 | 0.276 | | | |
| Seventh lens element 7 | Object-side surface 75 | 8.437 | 0.733 | 1.545 | 55.987 | 76.646 |
| | Image-side surface 76 | 10.242 | 1.297 | | | |
| Eighth lens element 8 | Object-side surface 85 | -4.874 | 0.200 | 1.545 | 55.987 | -8.227 |
| | Image-side surface 86 | 58.599 | 0.250 | | | |
| Filter 9 | Object-side surface 95 | Infinity | 0.339 | 1.563 | 51.300 | |
| | Image-side surface 96 | Infinity | 0.383 | | | |
| | Image plane 99 | Infinity | | | | |

FIG. 16

| Surface | K | $a_4$ | $a_6$ | $a_8$ | $a_{10}$ |
|---|---|---|---|---|---|
| 15 | -1.361569E-01 | -6.937001E-05 | 2.208260E-04 | -1.966699E-04 | 7.475738E-05 |
| 16 | -7.670301E+00 | 2.648167E-03 | -1.220684E-03 | 4.352509E-04 | -1.274561E-04 |
| 25 | -3.075892E+00 | 2.240512E-03 | -1.690370E-03 | 1.396678E-03 | -6.158578E-04 |
| 26 | 6.500733E-01 | 2.271195E-05 | -1.203588E-03 | 1.812797E-03 | -9.475971E-04 |
| 35 | -5.899620E-01 | 1.245852E-04 | 1.066208E-03 | -7.920857E-04 | 4.351198E-04 |
| 36 | -3.574759E+00 | -8.961957E-05 | -1.540155E-03 | 1.211891E-03 | -6.865968E-04 |
| 45 | 0.000000E+00 | -4.507288E-03 | -4.105278E-03 | 2.550355E-03 | -1.258357E-03 |
| 46 | 0.000000E+00 | -5.699604E-03 | -3.588338E-03 | 2.530418E-03 | -1.528023E-03 |
| 55 | -5.040363E+01 | -6.825631E-03 | 6.534317E-04 | -3.315007E-03 | 2.602003E-03 |
| 56 | 0.000000E+00 | -8.199876E-03 | -9.120707E-04 | -5.087817E-04 | 5.256737E-04 |
| 65 | -1.100867E+00 | -2.117404E-03 | -1.581360E-03 | -3.621028E-04 | 9.856262E-05 |
| 66 | 1.180403E+01 | -5.325802E-03 | 7.266354E-04 | -1.073029E-03 | 3.852628E-04 |
| 75 | -3.356434E+01 | -1.223013E-02 | 8.896168E-04 | -4.619491E-04 | 1.511528E-04 |
| 76 | -4.142189E+01 | -4.114159E-03 | -4.898784E-04 | 8.472210E-05 | -2.614511E-06 |
| 85 | -4.928911E-01 | 2.530701E-04 | 2.170487E-04 | -1.862758E-05 | 1.850626E-06 |
| 86 | 0.000000E+00 | -3.358092E-03 | -2.186376E-05 | 1.876387E-05 | -2.061079E-06 |
| Surface | $a_{12}$ | $a_{14}$ | $a_{16}$ | $a_{18}$ | $a_{20}$ |
| 15 | -1.648684E-05 | 1.676533E-06 | -6.659720E-08 | | |
| 16 | 1.984944E-05 | -1.138135E-06 | -7.454669E-09 | | |
| 25 | 1.529821E-04 | -1.912928E-05 | 9.113529E-07 | | |
| 26 | 2.726311E-04 | -3.910338E-05 | 2.049040E-06 | | |
| 35 | -1.276346E-04 | 2.028086E-05 | -1.290868E-06 | | |
| 36 | 2.121567E-04 | -3.436930E-05 | 2.305714E-06 | | |
| 45 | 3.340175E-04 | -4.805502E-05 | 2.631710E-06 | | |
| 46 | 6.041809E-04 | -1.617564E-04 | 2.758388E-05 | -2.697230E-06 | 1.145670E-07 |
| 55 | -1.171678E-03 | 3.136027E-04 | -5.018278E-05 | 4.413577E-06 | -1.643415E-07 |
| 56 | -2.243827E-04 | 5.153500E-05 | -6.767001E-06 | 4.789752E-07 | -1.399844E-08 |
| 65 | 1.598301E-05 | -1.204786E-05 | 2.315919E-06 | -1.971118E-07 | 6.256195E-09 |
| 66 | -7.794812E-05 | 9.477201E-06 | -6.819168E-07 | 2.682762E-08 | -4.463730E-10 |
| 75 | -2.698820E-05 | 2.767493E-06 | -1.633173E-07 | 5.137314E-09 | -6.593500E-11 |
| 76 | -7.658830E-07 | 1.072263E-07 | -6.339601E-09 | 1.854100E-10 | -2.201000E-12 |
| 85 | -1.305433E-07 | 5.672233E-09 | -1.464660E-10 | 2.074000E-12 | -1.200000E-14 |
| 86 | 1.288853E-07 | -4.863289E-09 | 1.104890E-10 | -1.398000E-12 | 8.000000E-15 |

FIG. 17

| Fourth embodiment | | | | | | |
|---|---|---|---|---|---|---|
| EFL= 8.023 mm, HFOV= 39.293°, TTL= 9.329 mm, Fno= 1.850, ImgH= 7.571 mm | | | | | | |
| Device | Surface | Radius of curvature (mm) | Distance (mm) | Refractive index | Abbe number | Focal length (mm) |
| Object | | Infinity | Infinity | | | |
| Aperture 0 | | Infinity | -0.783 | | | |
| First lens element 1 | Object-side surface 15 | 3.278 | 1.186 | 1.545 | 55.987 | 7.476 |
| | Image-side surface 16 | 14.496 | 0.114 | | | |
| Second lens element 2 | Object-side surface 25 | 8.545 | 0.262 | 1.671 | 19.480 | -13.564 |
| | Image-side surface 26 | 4.373 | 0.353 | | | |
| Third lens element 3 | Object-side surface 35 | 5.508 | 0.631 | 1.545 | 55.987 | 20.552 |
| | Image-side surface 36 | 10.377 | 0.680 | | | |
| Fourth lens element 4 | Object-side surface 45 | 150.400 | 0.616 | 1.671 | 19.480 | 250.040 |
| | Image-side surface 46 | 1338.334 | 0.333 | | | |
| Fifth lens element 5 | Object-side surface 55 | 12.618 | 0.401 | 1.545 | 55.987 | 82.470 |
| | Image-side surface 56 | 17.329 | 0.780 | | | |
| Sixth lens element 6 | Object-side surface 65 | -71.635 | 0.459 | 1.671 | 19.480 | -113.913 |
| | Image-side surface 66 | -1000.000 | 0.185 | | | |
| Seventh lens element 7 | Object-side surface 75 | 5.016 | 0.849 | 1.545 | 55.987 | 40.136 |
| | Image-side surface 76 | 6.116 | 1.441 | | | |
| Eighth lens element 8 | Object-side surface 85 | -4.881 | 0.322 | 1.545 | 55.987 | -8.273 |
| | Image-side surface 86 | 62.432 | 0.250 | | | |
| Filter 9 | Object-side surface 95 | Infinity | 0.339 | 1.563 | 51.300 | |
| | Image-side surface 96 | Infinity | 0.128 | | | |
| | Image plane 99 | Infinity | | | | |

FIG. 20

| Surface | K | $a_4$ | $a_6$ | $a_8$ | $a_{10}$ |
|---|---|---|---|---|---|
| 15 | -1.438790E-01 | 1.830967E-04 | 1.416055E-04 | -1.752698E-04 | 7.198917E-05 |
| 16 | -6.293109E+00 | 5.700739E-03 | -3.797090E-03 | 1.505445E-03 | -4.408084E-04 |
| 25 | -3.021118E+00 | 4.275653E-03 | -4.000661E-03 | 2.388088E-03 | -8.798425E-04 |
| 26 | 6.345787E-01 | -1.044252E-03 | -6.785853E-04 | 1.403887E-03 | -6.647822E-04 |
| 35 | -6.451946E-01 | -6.761406E-04 | 6.515193E-04 | -1.411397E-04 | 1.754569E-04 |
| 36 | -4.726050E+00 | -1.215231E-03 | -9.741086E-04 | 1.003827E-03 | -6.705349E-04 |
| 45 | 0.000000E+00 | -5.191645E-03 | -3.530281E-03 | 2.166945E-03 | -1.125815E-03 |
| 46 | 0.000000E+00 | -3.627726E-03 | -7.532527E-03 | 6.347914E-03 | -4.009474E-03 |
| 55 | -4.187512E+01 | -3.441072E-03 | -7.652079E-03 | 4.900839E-03 | -2.050737E-03 |
| 56 | 0.000000E+00 | -8.404444E-03 | -3.579847E-03 | 1.865205E-03 | -4.905499E-04 |
| 65 | -4.492602E-01 | 3.542982E-03 | -5.116846E-03 | 6.350815E-04 | -6.182339E-05 |
| 66 | -1.096152E-04 | -4.652994E-03 | 1.793823E-03 | -2.200188E-03 | 8.767172E-04 |
| 75 | -2.016907E+01 | -8.732995E-03 | 6.635109E-04 | -6.427400E-04 | 2.431055E-04 |
| 76 | -2.096961E+01 | -1.060320E-03 | -1.446228E-03 | 2.894583E-04 | -3.209305E-05 |
| 85 | -4.915994E-01 | 4.656678E-04 | 1.496935E-04 | -5.160556E-06 | 2.690779E-07 |
| 86 | 0.000000E+00 | -2.648314E-03 | -9.556715E-05 | 3.205847E-05 | -3.226982E-06 |
| Surface | $a_{12}$ | $a_{14}$ | $a_{16}$ | $a_{18}$ | $a_{20}$ |
| 15 | -1.775527E-05 | 1.978695E-06 | -8.362297E-08 | | |
| 16 | 8.143588E-05 | -7.556637E-06 | 2.378125E-07 | | |
| 25 | 2.025000E-04 | -2.436401E-05 | 1.118264E-06 | | |
| 26 | 1.792749E-04 | -2.389201E-05 | 1.018127E-06 | | |
| 35 | -8.006554E-05 | 1.766163E-05 | -1.475013E-06 | | |
| 36 | 2.504485E-04 | -4.945308E-05 | 3.955146E-06 | | |
| 45 | 3.167861E-04 | -4.731319E-05 | 2.567538E-06 | | |
| 46 | 1.650418E-03 | -4.445385E-04 | 7.517698E-05 | -7.236361E-06 | 3.010926E-07 |
| 55 | 4.775012E-04 | -5.955226E-05 | 2.034761E-06 | 3.284902E-07 | -2.903061E-08 |
| 56 | 3.314879E-05 | 1.087969E-05 | -2.839828E-06 | 2.649951E-07 | -8.842528E-09 |
| 65 | 2.943096E-05 | -1.315798E-05 | 2.556455E-06 | -2.283046E-07 | 7.606669E-09 |
| 66 | -1.949956E-04 | 2.595138E-05 | -2.043138E-06 | 8.777493E-08 | -1.587003E-09 |
| 75 | -4.635741E-05 | 4.963489E-06 | -3.041242E-07 | 9.977095E-09 | -1.358610E-10 |
| 76 | 2.187609E-06 | -9.512551E-08 | 2.623998E-09 | -4.268800E-11 | 3.120000E-13 |
| 85 | -1.600992E-08 | 5.386270E-10 | -8.292000E-12 | 3.200000E-14 | 2.941000E-16 |
| 86 | 1.830705E-07 | -6.289414E-09 | 1.305840E-10 | -1.511000E-12 | 7.467000E-15 |

FIG. 21

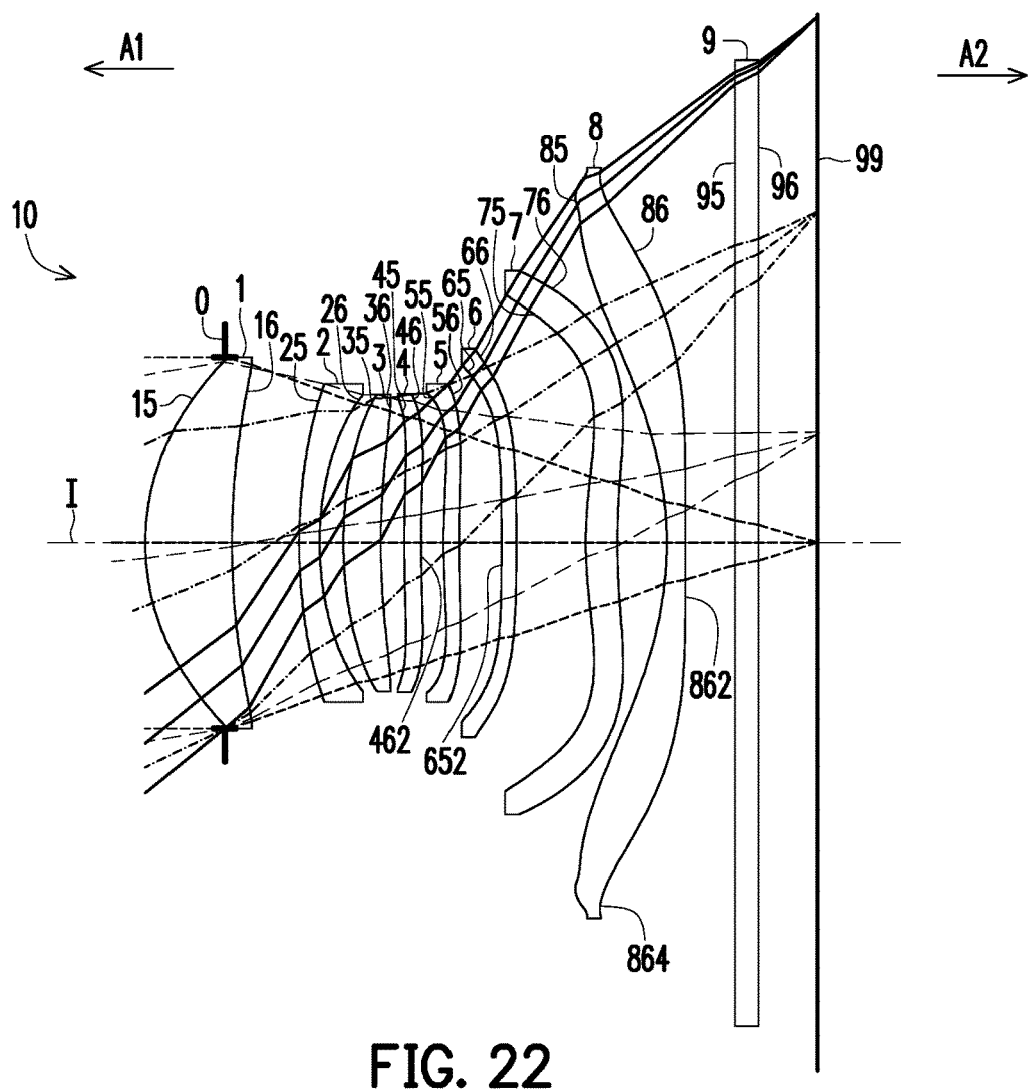
FIG. 22
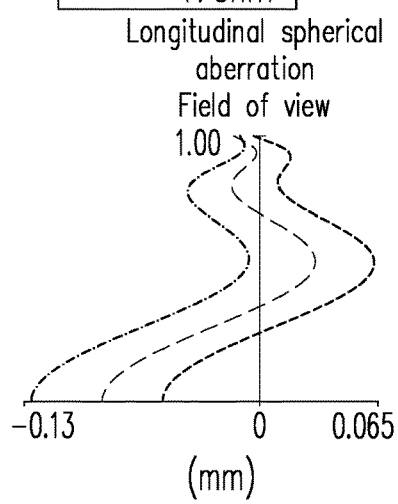
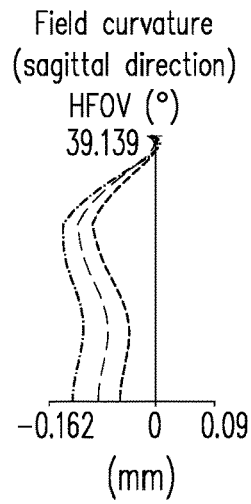
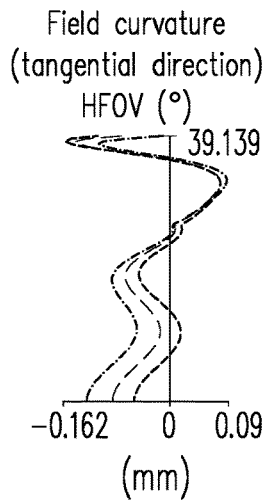
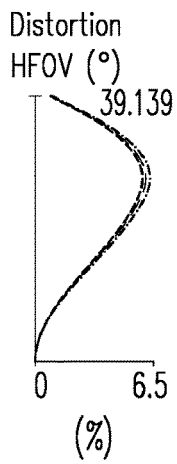
FIG. 23A  FIG. 23B  FIG. 23C  FIG. 23D

| Fifth embodiment | | | | | | |
|---|---|---|---|---|---|---|
| EFL= 8.919 mm, HFOV= 39.139°, TTL= 9.490 mm, Fno= 1.700, ImgH= 7.459 mm | | | | | | |
| Device | Surface | Radius of curvature (mm) | Distance (mm) | Refractive index | Abbe number | Focal length (mm) |
| Object | | Infinity | Infinity | | | |
| Aperture 0 | | Infinity | -1.120 | | | |
| First lens element 1 | Object-side surface 15 | 3.354 | 1.224 | 1.536 | 55.981 | 8.400 |
| | Image-side surface 16 | 11.336 | 0.949 | | | |
| Second lens element 2 | Object-side surface 25 | 7.745 | 0.288 | 1.671 | 19.276 | -15.528 |
| | Image-side surface 26 | 4.394 | 0.336 | | | |
| Third lens element 3 | Object-side surface 35 | 5.518 | 0.528 | 1.545 | 56.708 | 20.507 |
| | Image-side surface 36 | 10.506 | 0.332 | | | |
| Fourth lens element 4 | Object-side surface 45 | 19.665 | 0.236 | 1.536 | 55.981 | -348.120 |
| | Image-side surface 46 | 17.723 | 0.317 | | | |
| Fifth lens element 5 | Object-side surface 55 | 11.430 | 0.216 | 1.544 | 49.922 | 59.542 |
| | Image-side surface 56 | 17.503 | 0.603 | | | |
| Sixth lens element 6 | Object-side surface 65 | -56.087 | 0.210 | 1.671 | 19.480 | 171.653 |
| | Image-side surface 66 | -37.896 | 0.978 | | | |
| Seventh lens element 7 | Object-side surface 75 | 5.654 | 0.446 | 1.535 | 55.711 | 27.315 |
| | Image-side surface 76 | 8.948 | 0.702 | | | |
| Eighth lens element 8 | Object-side surface 85 | -5.166 | 0.261 | 1.545 | 56.708 | -9.006 |
| | Image-side surface 86 | 105.364 | 0.690 | | | |
| Filter 9 | Object-side surface 95 | Infinity | 0.339 | 1.563 | 51.300 | |
| | Image-side surface 96 | Infinity | 0.834 | | | |
| | Image plane 99 | Infinity | | | | |

FIG. 24

| Surface | K | $a_4$ | $a_6$ | $a_8$ | $a_{10}$ |
|---|---|---|---|---|---|
| 15 | -1.378606E-01 | -2.952571E-04 | 2.349387E-05 | -1.342441E-05 | -6.844075E-07 |
| 16 | -4.539402E+00 | 1.964850E-03 | -4.123274E-04 | 1.978306E-05 | 2.208893E-06 |
| 25 | -4.645508E+00 | 1.031811E-03 | 4.635544E-05 | 2.781144E-05 | 3.072368E-06 |
| 26 | 6.392875E-01 | -5.631546E-04 | 5.137350E-04 | 2.692552E-05 | -2.092174E-07 |
| 35 | -8.729278E-01 | 4.206145E-04 | 2.836316E-04 | 4.274341E-05 | 7.492825E-06 |
| 36 | -5.347803E+00 | -8.417390E-04 | -3.669759E-04 | -2.450825E-05 | -1.101871E-06 |
| 45 | 0.000000E+00 | -5.163130E-03 | -9.490265E-04 | -2.008482E-05 | -1.499548E-05 |
| 46 | 0.000000E+00 | -7.032384E-03 | -9.296041E-04 | -2.076369E-05 | -1.799979E-05 |
| 55 | -7.664769E+01 | -5.687047E-03 | -1.598031E-03 | -5.581337E-05 | -2.090916E-05 |
| 56 | 0.000000E+00 | -8.671314E-03 | -5.358374E-04 | -3.269483E-06 | -3.908606E-06 |
| 65 | -4.352099E+01 | -4.494618E-03 | -1.852164E-03 | 5.257224E-05 | 3.495279E-06 |
| 66 | 1.356502E+02 | -4.278807E-03 | -9.386193E-04 | 3.379227E-05 | -3.926502E-07 |
| 75 | -1.084737E+01 | -1.157218E-02 | 9.139053E-05 | -2.408608E-05 | 1.197847E-06 |
| 76 | -9.988459E+00 | -7.650957E-03 | -2.090958E-04 | 2.165116E-05 | -8.651668E-07 |
| 85 | -5.028904E-01 | 5.567349E-04 | 1.523525E-04 | -3.750587E-06 | 2.473144E-08 |
| 86 | 0.000000E+00 | -3.962811E-03 | 8.471399E-05 | -1.763028E-06 | 4.714248E-08 |
| Surface | $a_{12}$ | $a_{14}$ | $a_{16}$ | $a_{18}$ | $a_{20}$ |
| 15 | -6.489288E-08 | 3.946450E-10 | -9.799560E-10 | | |
| 16 | -1.928242E-07 | -4.022551E-08 | 3.794439E-09 | | |
| 25 | 2.729891E-07 | -8.608937E-08 | -1.033840E-08 | | |
| 26 | 3.123660E-06 | 7.951214E-07 | -2.552411E-07 | | |
| 35 | 5.007043E-07 | -1.314437E-07 | 1.166615E-07 | | |
| 36 | -4.275626E-08 | -1.322849E-07 | 2.093767E-08 | | |
| 45 | -1.412733E-06 | 4.636791E-08 | -2.839801E-08 | | |
| 46 | -9.476186E-07 | -1.099243E-07 | -9.805850E-09 | 4.104780E-09 | 2.818278E-09 |
| 55 | -1.513861E-06 | -1.324400E-07 | -2.549634E-08 | -1.354808E-08 | -6.007873E-09 |
| 56 | 6.560952E-08 | 2.338467E-08 | 8.405852E-09 | 1.848707E-09 | 4.056050E-10 |
| 65 | -1.046110E-07 | 2.428008E-08 | 7.526163E-09 | 5.395300E-10 | -3.067400E-11 |
| 66 | 1.839527E-07 | 1.283652E-08 | 1.315046E-09 | 1.478960E-10 | 1.724900E-11 |
| 75 | -8.474036E-08 | 1.124368E-09 | 1.882150E-10 | 1.371000E-11 | 4.770000E-13 |
| 76 | -2.160729E-08 | 7.337000E-11 | 4.048000E-11 | 1.525000E-12 | -6.000000E-14 |
| 85 | 1.396460E-10 | 3.433000E-12 | -2.483000E-14 | 2.799000E-15 | 2.045000E-16 |
| 86 | 4.781910E-10 | -2.057300E-11 | 3.065000E-13 | 9.058000E-15 | 9.580000E-17 |

FIG. 25

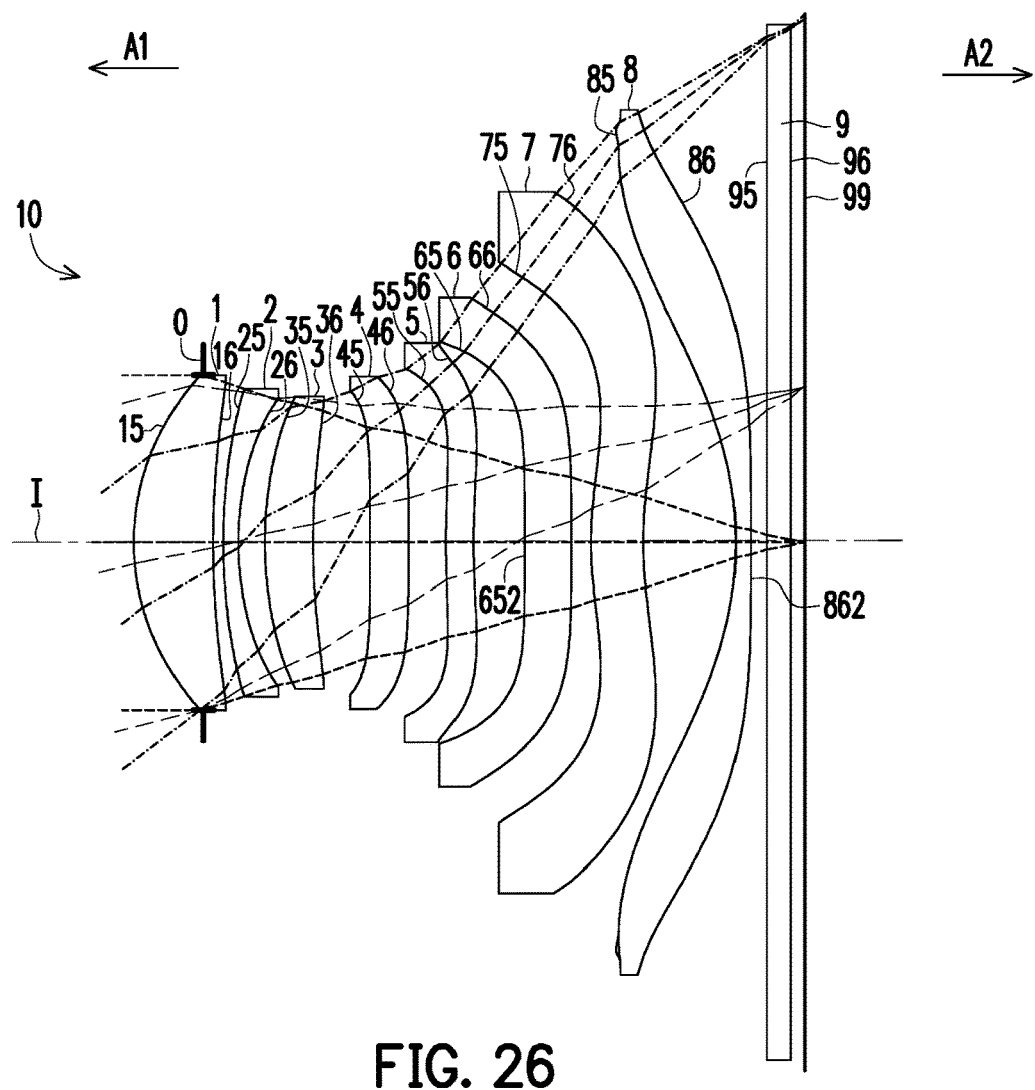
FIG. 26
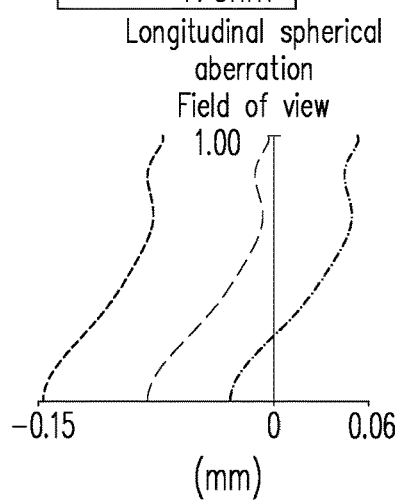
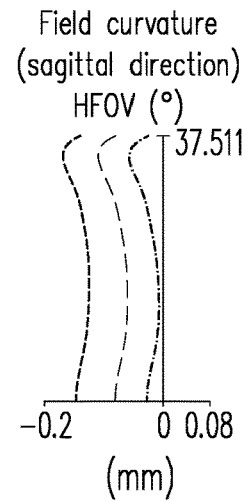
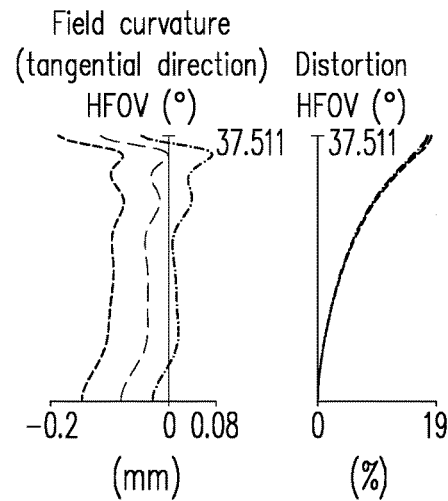
FIG. 27A  FIG. 27B  FIG. 27C  FIG. 27D

| Sixth embodiment | | | | | | |
|---|---|---|---|---|---|---|
| EFL= 7.921 mm, HFOV= 37.511°, TTL= 9.319 mm, Fno= 1.700, ImgH= 7.300 mm | | | | | | |
| Device | Surface | Radius of curvature (mm) | Distance (mm) | Refractive index | Abbe number | Focal length (mm) |
| Object | | Infinity | Infinity | | | |
| Aperture 0 | | Infinity | -0.964 | | | |
| First lens element 1 | Object-side surface 15 | 3.321 | 1.097 | 1.544 | 49.922 | 7.640 |
| | Image-side surface 16 | 14.338 | 0.140 | | | |
| Second lens element 2 | Object-side surface 25 | 8.318 | 0.210 | 1.567 | 37.533 | -16.058 |
| | Image-side surface 26 | 4.317 | 0.370 | | | |
| Third lens element 3 | Object-side surface 35 | 5.498 | 0.670 | 1.545 | 55.987 | 20.600 |
| | Image-side surface 36 | 10.286 | 0.790 | | | |
| Fourth lens element 4 | Object-side surface 45 | 102.316 | 0.538 | 1.545 | 55.987 | 127.076 |
| | Image-side surface 46 | -215.502 | 0.521 | | | |
| Fifth lens element 5 | Object-side surface 55 | 14.575 | 0.377 | 1.671 | 19.243 | -104.987 |
| | Image-side surface 56 | 11.970 | 0.711 | | | |
| Sixth lens element 6 | Object-side surface 65 | -142.725 | 0.653 | 1.671 | 19.243 | 161.898 |
| | Image-side surface 66 | -62.138 | 0.271 | | | |
| Seventh lens element 7 | Object-side surface 75 | 5.057 | 0.728 | 1.545 | 55.987 | 51.986 |
| | Image-side surface 76 | 5.840 | 1.285 | | | |
| Eighth lens element 8 | Object-side surface 85 | -4.865 | 0.203 | 1.544 | 49.922 | -8.889 |
| | Image-side surface 86 | 3423.492 | 0.219 | | | |
| Filter 9 | Object-side surface 95 | Infinity | 0.339 | 1.563 | 51.300 | |
| | Image-side surface 96 | Infinity | 0.195 | | | |
| | Image plane 99 | Infinity | | | | |

FIG. 28

| Surface | K | $a_4$ | $a_6$ | $a_8$ | $a_{10}$ |
|---|---|---|---|---|---|
| 15 | -1.314608E-01 | 1.031463E-04 | 3.137729E-05 | -8.994182E-06 | -1.227148E-05 |
| 16 | -7.559723E+00 | 3.291366E-03 | -1.243746E-03 | 1.093998E-04 | 7.577986E-05 |
| 25 | -3.682588E+00 | 2.515806E-03 | -1.614250E-03 | 6.469474E-04 | -6.952197E-05 |
| 26 | 7.278637E-01 | -6.005610E-04 | 9.563152E-05 | 1.249014E-04 | 1.939147E-04 |
| 35 | -5.285530E-01 | -3.787561E-04 | 1.151036E-03 | -7.513125E-04 | 4.582189E-04 |
| 36 | -3.390583E+00 | -7.692309E-04 | -1.332039E-03 | 1.169561E-03 | -6.816200E-04 |
| 45 | 0.000000E+00 | -5.012057E-03 | -3.068227E-03 | 1.238095E-03 | -4.793928E-04 |
| 46 | 0.000000E+00 | -2.600986E-03 | -6.351194E-03 | 4.783303E-03 | -3.043468E-03 |
| 55 | -6.051595E+01 | -4.925739E-03 | -4.420191E-03 | 1.693284E-03 | -1.368675E-04 |
| 56 | 0.000000E+00 | -7.692644E-03 | -4.094864E-03 | 2.235383E-03 | -6.977102E-04 |
| 65 | 1.037908E+02 | 1.522858E-03 | -4.295367E-03 | 2.395495E-04 | 2.186306E-04 |
| 66 | 5.802647E+01 | -1.499124E-03 | -1.914408E-03 | -7.755480E-05 | 1.936223E-04 |
| 75 | -2.023071E+01 | -6.347289E-03 | -1.580412E-03 | 2.820989E-04 | 1.910271E-05 |
| 76 | -2.522915E+01 | -6.222529E-05 | -2.065180E-03 | 4.327988E-04 | -4.957616E-05 |
| 85 | -4.900505E-01 | 3.739688E-04 | 1.996425E-04 | -1.997958E-05 | 2.319866E-06 |
| 86 | 0.000000E+00 | -2.617265E-03 | -2.815033E-04 | 7.658181E-05 | -8.682264E-06 |
| Surface | $a_{12}$ | $a_{14}$ | $a_{16}$ | $a_{18}$ | $a_{20}$ |
| 15 | 5.532413E-06 | -1.112546E-06 | 7.192569E-08 | | |
| 16 | -3.253660E-05 | 5.146967E-06 | -2.954441E-07 | | |
| 25 | -2.139996E-05 | 7.088059E-06 | -5.936584E-07 | | |
| 26 | -1.173293E-04 | 2.667582E-05 | -2.298186E-06 | | |
| 35 | -1.450378E-04 | 2.424421E-05 | -1.665920E-06 | | |
| 36 | 2.194961E-04 | -3.639213E-05 | 2.397992E-06 | | |
| 45 | 9.804168E-05 | -1.044085E-05 | 1.794742E-07 | | |
| 46 | 1.275769E-03 | -3.485731E-04 | 5.918793E-05 | -5.668160E-06 | 2.328819E-07 |
| 55 | -2.468997E-04 | 1.161958E-04 | -2.422794E-05 | 2.504895E-06 | -1.050080E-07 |
| 56 | 1.047309E-04 | -3.635847E-06 | -1.123082E-06 | 1.565551E-07 | -6.107247E-09 |
| 65 | -9.219638E-05 | 1.607886E-05 | -1.411975E-06 | 5.783727E-08 | -8.466320E-10 |
| 66 | -6.188212E-05 | 9.776587E-06 | -8.434666E-07 | 3.796832E-08 | -6.984990E-10 |
| 75 | -1.235859E-05 | 1.718980E-06 | -1.152340E-07 | 3.831506E-09 | -4.998900E-11 |
| 76 | 3.428363E-06 | -1.443984E-07 | 3.517478E-09 | -4.224700E-11 | 1.450000E-13 |
| 85 | -1.707110E-07 | 7.270388E-09 | -1.774480E-10 | 2.319000E-12 | -1.300000E-14 |
| 86 | 5.664665E-07 | -2.236131E-08 | 5.275350E-10 | -6.837000E-12 | 3.700000E-14 |

FIG. 29

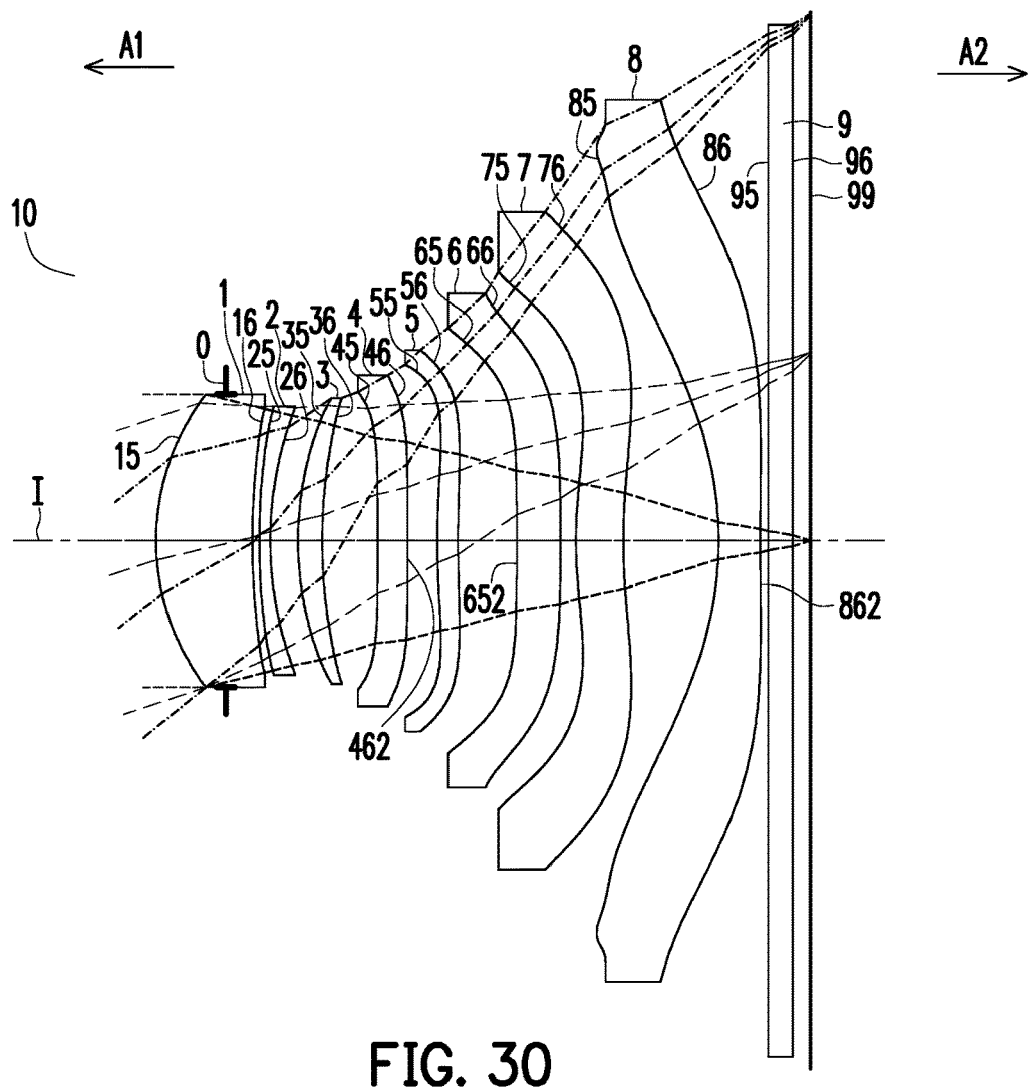
FIG. 30
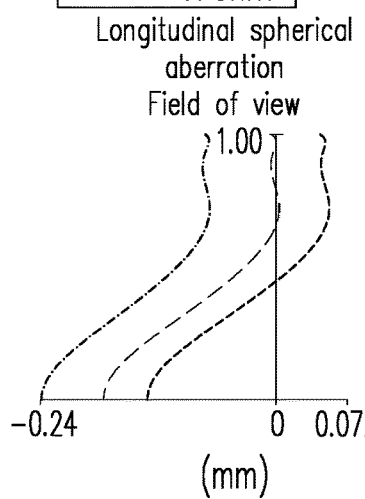
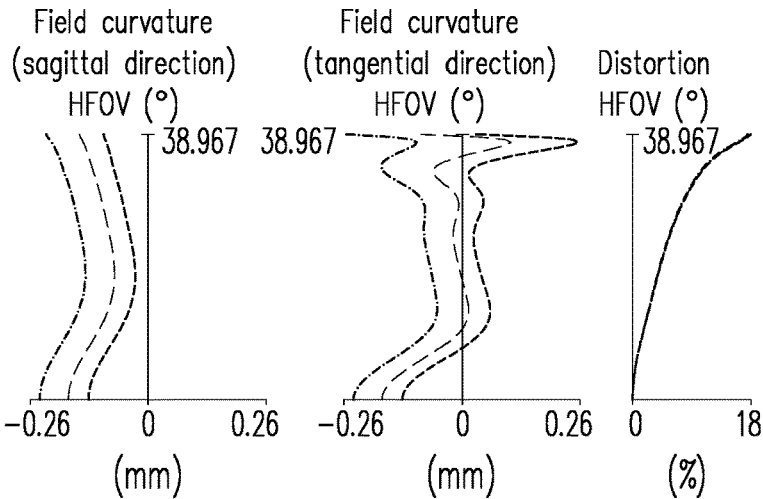
FIG. 31A   FIG. 31B   FIG. 31C   FIG. 31D

| Seventh embodiment | | | | | | |
|---|---|---|---|---|---|---|
| EFL= 7.215 mm, HFOV= 38.967°, TTL= 8.936 mm, Fno= 1.800, ImgH= 7.189 mm | | | | | | |
| Device | Surface | Radius of curvature (mm) | Distance (mm) | Refractive index | Abbe number | Focal length (mm) |
| Object | | Infinity | Infinity | | | |
| Aperture 0 | | Infinity | -0.951 | | | |
| First lens element 1 | Object-side surface 15 | 3.241 | 1.316 | 1.545 | 55.987 | 7.830 |
| | Image-side surface 16 | 11.459 | 0.094 | | | |
| Second lens element 2 | Object-side surface 25 | 9.985 | 0.150 | 1.545 | 55.987 | -18.537 |
| | Image-side surface 26 | 5.001 | 0.379 | | | |
| Third lens element 3 | Object-side surface 35 | 4.475 | 0.330 | 1.545 | 55.987 | 20.323 |
| | Image-side surface 36 | 7.300 | 0.758 | | | |
| Fourth lens element 4 | Object-side surface 45 | 356.203 | 0.410 | 1.671 | 19.243 | -298.271 |
| | Image-side surface 46 | 128.879 | 0.405 | | | |
| Fifth lens element 5 | Object-side surface 55 | 10.285 | 0.284 | 1.545 | 55.987 | 48.412 |
| | Image-side surface 56 | 16.667 | 0.802 | | | |
| Sixth lens element 6 | Object-side surface 65 | -63.058 | 0.599 | 1.671 | 19.243 | 118.680 |
| | Image-side surface 66 | -35.478 | 0.207 | | | |
| Seventh lens element 7 | Object-side surface 75 | 5.818 | 0.650 | 1.545 | 55.987 | 31.197 |
| | Image-side surface 76 | 8.485 | 1.301 | | | |
| Eighth lens element 8 | Object-side surface 85 | -4.872 | 0.567 | 1.671 | 19.243 | -6.569 |
| | Image-side surface 86 | 53.840 | 0.105 | | | |
| Filter 9 | Object-side surface 95 | Infinity | 0.339 | 1.563 | 51.300 | |
| | Image-side surface 96 | Infinity | 0.239 | | | |
| | Image plane 99 | Infinity | | | | |

FIG. 32

| Surface | K | $a_4$ | $a_6$ | $a_8$ | $a_{10}$ |
|---|---|---|---|---|---|
| 15 | -1.497863E-01 | -4.734851E-04 | 3.224131E-04 | -1.907392E-04 | 7.321061E-05 |
| 16 | -5.276539E+00 | 2.819924E-03 | -1.216340E-03 | 4.641046E-04 | -1.171249E-04 |
| 25 | -2.838683E+00 | 2.349138E-03 | -1.569109E-03 | 1.408105E-03 | -6.127826E-04 |
| 26 | 3.553112E-01 | -4.723937E-04 | -1.416441E-03 | 1.791751E-03 | -9.514882E-04 |
| 35 | -1.036225E+00 | -6.471296E-04 | 1.077995E-03 | -7.927162E-04 | 4.370845E-04 |
| 36 | 8.209381E-01 | 8.990669E-04 | -1.636128E-03 | 1.207109E-03 | -6.840596E-04 |
| 45 | 0.000000E+00 | -5.426973E-03 | -4.115998E-03 | 2.523956E-03 | -1.264293E-03 |
| 46 | 0.000000E+00 | -5.015277E-03 | -3.541232E-03 | 2.543899E-03 | -1.525775E-03 |
| 55 | -8.740745E+01 | -4.418707E-03 | 7.344748E-04 | -3.309166E-03 | 2.604572E-03 |
| 56 | 0.000000E+00 | -8.538319E-03 | -8.897079E-04 | -5.080692E-04 | 5.252707E-04 |
| 65 | -2.026592E+03 | -8.887368E-04 | -1.592108E-03 | -3.724302E-04 | 9.875730E-05 |
| 66 | -8.240173E+00 | -4.877204E-03 | 7.909583E-04 | -1.068297E-03 | 3.856013E-04 |
| 75 | -2.181157E+01 | -1.197283E-02 | 8.839016E-04 | -4.626765E-04 | 1.511058E-04 |
| 76 | -2.229890E+01 | -4.149097E-03 | -4.958783E-04 | 8.501036E-05 | -2.591523E-06 |
| 85 | -4.940667E-01 | 2.742628E-04 | 2.174183E-04 | -1.862122E-05 | 1.850722E-06 |
| 86 | 0.000000E+00 | -3.341658E-03 | -2.191439E-05 | 1.875805E-05 | -2.061324E-06 |
| Surface | $a_{12}$ | $a_{14}$ | $a_{16}$ | $a_{18}$ | $a_{20}$ |
| 15 | -1.682908E-05 | 1.712594E-06 | -1.955524E-08 | | |
| 16 | 2.242777E-05 | -5.250392E-07 | 1.700342E-07 | | |
| 25 | 1.544115E-04 | -1.869423E-05 | 9.634008E-07 | | |
| 26 | 2.707084E-04 | -3.989599E-05 | 1.803646E-06 | | |
| 35 | -1.263898E-04 | 2.069825E-05 | -1.213140E-06 | | |
| 36 | 2.133130E-04 | -3.384984E-05 | 2.541213E-06 | | |
| 45 | 3.333567E-04 | -4.807420E-05 | 2.628292E-06 | | |
| 46 | 6.045218E-04 | -1.616906E-04 | 2.760103E-05 | -2.692271E-06 | 1.159676E-07 |
| 55 | -1.171204E-03 | 3.136454E-04 | -5.018571E-05 | 4.411308E-06 | -1.649754E-07 |
| 56 | -2.244719E-04 | 5.152096E-05 | -6.769172E-06 | 4.786033E-07 | -1.406665E-08 |
| 65 | 1.614132E-05 | -1.202048E-05 | 2.319848E-06 | -1.965726E-07 | 6.328744E-09 |
| 66 | -7.792407E-05 | 9.478863E-06 | -6.818039E-07 | 2.683502E-08 | -4.458950E-10 |
| 75 | -2.698982E-05 | 2.767572E-06 | -1.632951E-07 | 5.140098E-09 | -6.565700E-11 |
| 76 | -7.646970E-07 | 1.072779E-07 | -6.337410E-09 | 1.854990E-10 | -2.196000E-12 |
| 85 | -1.305425E-07 | 5.672211E-09 | -1.464680E-10 | 2.074000E-12 | -1.200000E-14 |
| 86 | 1.288803E-07 | -4.863459E-09 | 1.104830E-10 | -1.398000E-12 | 8.000000E-15 |

FIG. 33

| Eighth embodiment | | | | | | |
|---|---|---|---|---|---|---|
| EFL= 8.682 mm, HFOV= 33.911°, TTL= 9.878 mm, Fno= 1.700, ImgH= 7.500 mm | | | | | | |
| Device | Surface | Radius of curvature (mm) | Distance (mm) | Refractive index | Abbe number | Focal length (mm) |
| Object | | Infinity | Infinity | | | |
| Aperture 0 | | Infinity | -1.072 | | | |
| First lens element 1 | Object-side surface 15 | 3.417 | 1.105 | 1.545 | 55.987 | 7.476 |
| | Image-side surface 16 | 18.527 | 0.170 | | | |
| Second lens element 2 | Object-side surface 25 | 8.467 | 0.225 | 1.671 | 19.480 | -13.562 |
| | Image-side surface 26 | 4.359 | 0.689 | | | |
| Third lens element 3 | Object-side surface 35 | 4.935 | 0.922 | 1.545 | 55.987 | 21.536 |
| | Image-side surface 36 | 7.939 | 0.764 | | | |
| Fourth lens element 4 | Object-side surface 45 | 183.181 | 0.488 | 1.671 | 19.480 | 104.593 |
| | Image-side surface 46 | -115.448 | 0.556 | | | |
| Fifth lens element 5 | Object-side surface 55 | 11.629 | 0.400 | 1.545 | 55.987 | 185.942 |
| | Image-side surface 56 | 12.973 | 0.816 | | | |
| Sixth lens element 6 | Object-side surface 65 | -210.366 | 0.432 | 1.671 | 19.480 | -413.112 |
| | Image-side surface 66 | -847.593 | 0.478 | | | |
| Seventh lens element 7 | Object-side surface 75 | 4.079 | 0.701 | 1.545 | 55.987 | -19.088 |
| | Image-side surface 76 | 2.754 | 0.950 | | | |
| Eighth lens element 8 | Object-side surface 85 | -8.760 | 0.569 | 1.545 | 55.987 | 100.718 |
| | Image-side surface 86 | -7.730 | 0.250 | | | |
| Filter 9 | Object-side surface 95 | Infinity | 0.339 | 1.563 | 51.300 | |
| | Image-side surface 96 | Infinity | 0.022 | | | |
| | Image plane 99 | Infinity | | | | |

FIG. 36

| Surface | K | $a_4$ | $a_6$ | $a_8$ | $a_{10}$ |
|---|---|---|---|---|---|
| 15 | -1.062787E-01 | 2.041741E-04 | -1.105598E-04 | 5.371849E-05 | -2.602503E-05 |
| 16 | 2.317662E+00 | 1.591258E-03 | -2.155426E-05 | -1.721927E-04 | 5.323777E-05 |
| 25 | -2.093392E+00 | -1.995242E-03 | 2.927390E-03 | -1.117403E-03 | 2.673971E-04 |
| 26 | 7.522480E-01 | -4.237088E-03 | 3.536094E-03 | -1.047562E-03 | 2.218777E-04 |
| 35 | -6.410046E-01 | -1.959987E-04 | 8.668169E-04 | -2.122229E-04 | 9.574104E-05 |
| 36 | -1.795523E+00 | -1.697270E-03 | 2.327618E-04 | -1.097714E-04 | 5.257361E-05 |
| 45 | 0.000000E+00 | -1.020458E-02 | -2.969276E-04 | -2.966593E-04 | 1.273203E-04 |
| 46 | 0.000000E+00 | -1.151003E-02 | -1.446825E-03 | 1.095468E-03 | -6.903667E-04 |
| 55 | -7.895786E+00 | -8.232790E-03 | -7.795250E-03 | 5.559266E-03 | -2.971185E-03 |
| 56 | 0.000000E+00 | -3.269000E-03 | -8.914672E-03 | 5.384619E-03 | -2.283412E-03 |
| 65 | -1.320301E-04 | 1.301220E-02 | -1.152921E-02 | 3.018287E-03 | -6.868482E-04 |
| 66 | -9.504783E-07 | 1.038539E-02 | -5.860188E-03 | -6.896789E-05 | 4.239933E-04 |
| 75 | -2.165256E+01 | -8.976374E-03 | -3.447479E-03 | 1.634352E-03 | -6.092485E-04 |
| 76 | -8.419909E+00 | -5.085820E-03 | -1.133825E-03 | 2.966687E-04 | -4.546944E-05 |
| 85 | 1.265453E-01 | 7.643714E-03 | -4.012629E-03 | 6.987966E-04 | -6.264727E-05 |
| 86 | 0.000000E+00 | 3.359967E-02 | -1.245636E-02 | 2.109476E-03 | -2.028092E-04 |
| Surface | $a_{12}$ | $a_{14}$ | $a_{16}$ | $a_{18}$ | $a_{20}$ |
| 15 | 5.637027E-06 | -7.095490E-07 | 3.458671E-08 | | |
| 16 | -8.142555E-06 | 6.547976E-07 | -2.130170E-08 | | |
| 25 | -3.882802E-05 | 3.260136E-06 | -1.267142E-07 | | |
| 26 | -2.888596E-05 | 2.161546E-06 | -1.215823E-07 | | |
| 35 | -2.488962E-05 | 3.551557E-06 | -2.148779E-07 | | |
| 36 | -1.740056E-05 | 3.171844E-06 | -2.864554E-07 | | |
| 45 | -4.683197E-05 | 8.852886E-06 | -8.164980E-07 | | |
| 46 | 2.629482E-04 | -6.274627E-05 | 9.087649E-06 | -7.386062E-07 | 2.529843E-08 |
| 55 | 1.045809E-03 | -2.447916E-04 | 3.657500E-05 | -3.151632E-06 | 1.172395E-07 |
| 56 | 6.508278E-04 | -1.241539E-04 | 1.525472E-05 | -1.095337E-06 | 3.488068E-08 |
| 65 | 1.545725E-04 | -2.975150E-05 | 3.792186E-06 | -2.651385E-07 | 7.486026E-09 |
| 66 | -1.160840E-04 | 1.578902E-05 | -1.189610E-06 | 4.679452E-08 | -7.421950E-10 |
| 75 | 1.507370E-04 | -2.282526E-05 | 2.035043E-06 | -9.837684E-08 | 1.985725E-09 |
| 76 | 4.710798E-06 | -3.062062E-07 | 1.166301E-08 | -2.358760E-10 | 1.945000E-12 |
| 85 | 3.319050E-06 | -1.083476E-07 | 2.150246E-09 | -2.385200E-11 | 1.130000E-13 |
| 86 | 1.198284E-05 | -4.443722E-07 | 1.008950E-08 | -1.281200E-10 | 6.960000E-13 |

FIG. 37

| Parameter/condition expression | First embodiment | Second embodiment | Third embodiment | Fourth embodiment |
|---|---|---|---|---|
| BFL | 0.609 | 0.815 | 0.972 | 0.717 |
| ALT | 4.453 | 4.344 | 4.169 | 4.725 |
| AAG | 4.255 | 4.164 | 4.302 | 3.887 |
| TL | 8.707 | 8.508 | 8.471 | 8.612 |
| TTL | 9.317 | 9.323 | 9.443 | 9.329 |
| EPD | 4.725 | 4.787 | 4.703 | 4.337 |
| (V2+V5+V7)/V8 | 2.348 | 2.348 | 2.348 | 2.348 |
| V2+V5 | 75.467 | 75.467 | 75.467 | 75.467 |
| V4+V7 | 75.467 | 75.467 | 75.467 | 75.467 |
| V1+V4 | 75.467 | 75.467 | 75.467 | 75.467 |
| Fno*TL/AAG | 3.479 | 3.473 | 3.545 | 4.099 |
| (T1+T2)/(G12+G23) | 2.274 | 2.280 | 1.944 | 3.100 |
| (T1+G12+T2+BFL)/(G34+G67) | 1.954 | 2.238 | 2.341 | 2.633 |
| (T2+G78+T8)/T4 | 3.352 | 3.299 | 3.538 | 3.289 |
| (T1+G78+T8)/T7 | 3.541 | 3.616 | 3.599 | 3.471 |
| (T5+G78+T8)/(G34+G67) | 1.723 | 1.742 | 1.719 | 2.500 |
| (ImgH+EFL)/ALT | 3.443 | 3.554 | 3.781 | 3.300 |
| (ImgH+EPD)/(T1+T6+T8) | 6.453 | 6.546 | 6.520 | 6.056 |
| TTL/(G12+G23+G34+G67) | 5.466 | 5.619 | 5.354 | 7.000 |
| (T6+G78+T8)/G67 | 6.617 | 7.613 | 7.238 | 12.000 |
| ALT/(G12+G23+G34+G45) | 2.374 | 2.281 | 2.182 | 3.193 |
| Fno*(T5+G56+T6)/T4 | 5.106 | 5.013 | 6.220 | 4.930 |
| (T5+G56+T6+G78+T8)/G34 | 3.988 | 3.845 | 3.972 | 5.002 |
| Fno*(G45+T5+G56)/(G34+T4) | 1.996 | 1.994 | 2.235 | 2.161 |

FIG. 38

| Parameter/condition expression | Fifth embodiment | Sixth embodiment | Seventh embodiment | Eighth embodiment |
|---|---|---|---|---|
| BFL | 1.864 | 0.754 | 0.684 | 0.611 |
| ALT | 3.410 | 4.476 | 4.306 | 4.843 |
| AAG | 4.216 | 4.089 | 3.946 | 4.423 |
| TL | 7.626 | 8.565 | 8.252 | 9.266 |
| TTL | 9.490 | 9.319 | 8.936 | 9.878 |
| EPD | 5.246 | 4.660 | 4.009 | 5.107 |
| (V2+V5+V7)/V8 | 2.203 | 2.264 | 8.622 | 2.348 |
| V2+V5 | 69.198 | 57.013 | 111.974 | 75.467 |
| V4+V7 | 111.691 | 111.974 | 75.467 | 75.467 |
| V1+V4 | 111.961 | 105.909 | 75.467 | 75.467 |
| Fno*TL/AAG | 3.075 | 3.561 | 3.764 | 3.561 |
| (T1+T2)/(G12+G23) | 1.177 | 2.560 | 3.100 | 1.549 |
| (T1+G12+T2+BFL)/(G34+G67) | 3.302 | 2.074 | 2.324 | 1.701 |
| (T2+G78+T8)/T4 | 5.298 | 3.156 | 4.924 | 3.570 |
| (T1+G78+T8)/T7 | 4.900 | 3.553 | 4.900 | 3.742 |
| (T5+G78+T8)/(G34+G67) | 0.900 | 1.758 | 2.230 | 1.545 |
| (ImgH+EFL)/ALT | 4.803 | 3.401 | 3.345 | 3.341 |
| (ImgH+EPD)/(T1+T6+T8) | 7.495 | 6.125 | 4.511 | 5.985 |
| TTL/(G12+G23+G34+G67) | 3.658 | 5.929 | 6.214 | 4.700 |
| (T6+G78+T8)/G67 | 1.200 | 7.897 | 11.893 | 4.084 |
| ALT/(G12+G23+G34+G45) | 1.763 | 2.457 | 2.633 | 2.222 |
| Fno*(T5+G56+T6)/T4 | 7.400 | 5.498 | 7.400 | 5.735 |
| (T5+G56+T6+G78+T8)/G34 | 6.000 | 4.087 | 4.690 | 4.143 |
| Fno*(G45+T5+G56)/(G34+T4) | 3.399 | 2.060 | 2.298 | 2.404 |

FIG. 39

OPTICAL IMAGING LENS

CROSS-REFERENCE TO RELATED APPLICATION

This application claims the priority benefit of Chinese application no. 202111624102.7, filed on Dec. 28, 2021. The entirety of the above-mentioned patent application is hereby incorporated by reference herein and made a part of this specification.

BACKGROUND

Technical Field

The disclosure relates to an optical device. Particularly, the disclosure relates to an optical imaging lens.

Description of Related Art

Specifications of portable electronic devices are changing with each passing day, and the development of their key parts, i.e., optical imaging lenses, is also increasingly diversified. For the main lens of the portable electronic device, it is required to not only include a larger aperture and maintain a shorter system length, but also pursue a greater number of pixels and a higher resolution. Meanwhile, the great number of pixels implies the necessity to increase an image height of the lens by adopting a greater image sensor to receive imaging rays so as to meet the requirement for an increased number of pixels. However, although the design of a large aperture enables the lens to receive more imaging rays, the design difficulty is also increased. Moreover, the great number of pixels leads to the necessity to increase the resolution of the lens. Combined with the design requirements for the large aperture, the design difficulty is increased multiple times. Therefore, in the optical imaging lens, how to add multiple lens elements within a limited system length in addition to also increasing the resolution, the aperture size, and the image height is an issue to be challenged and solved.

SUMMARY

The disclosure provides an optical imaging lens that has a relatively large aperture and a relatively large image height, and a resolution of the lens is increased. The optical imaging lens may be used for shooting images and videos, and may be applied to portable electronic products, for example, a mobile phone, a camera, a tablet computer, a personal digital assistant (PDA), a head-mounted display (e.g., a display of augmented reality (AR), virtual reality (VR), or mixed reality (MR)), or the like.

According to an embodiment of the disclosure, an optical imaging lens includes a first lens element, a second lens element, a third lens element, a fourth lens element, a fifth lens element, a sixth lens element, a seventh lens element, and an eighth lens element sequentially arranged along an optical axis from an object side to an image side. Each of the first lens element to the eighth lens element includes an object-side surface facing the object side and allowing an imaging ray to pass through and an image-side surface facing the image side and allowing the imaging ray to pass through. The first lens element has positive refracting power. A periphery region of the object-side surface of the second lens element is convex. The third lens element has positive refracting power. A periphery region of the image-side surface of the third lens element is concave. An optical axis region of the image-side surface of the fifth lens element is concave. An optical axis region of the image-side surface of the sixth lens element is convex. A periphery region of the object-side surface of the eighth lens element is convex. Lens elements of the optical imaging lens are only the eight lens elements, and the optical imaging lens satisfies (V2+V5+V7)/V8≥2.200, where V2 is an Abbe number of the second lens element, V5 is an Abbe number of the fifth lens element, V7 is an Abbe number of the seventh lens element, and V8 is an Abbe number of the eighth lens element.

According to an embodiment of the disclosure, an optical imaging lens includes a first lens element, a second lens element, a third lens element, a fourth lens element, a fifth lens element, a sixth lens element, a seventh lens element, and an eighth lens element sequentially arranged along an optical axis from an object side to an image side. Each of the first lens element to the eighth lens element includes an object-side surface facing the object side and allowing an imaging ray to pass through and an image-side surface facing the image side and allowing the imaging ray to pass through. The first lens element has positive refracting power. The third lens element has positive refracting power. A periphery region of the image-side surface of the third lens element is concave. An optical axis region of the image-side surface of the fifth lens element is concave. A periphery region of the object-side surface of the sixth lens element is concave. An optical axis region of the image-side surface of the sixth lens element is convex. A periphery region of the object-side surface of the eighth lens element is convex. Lens elements of the optical imaging lens are only the eight lens elements, and the optical imaging lens satisfies (V2+V5+V7)/V8≥2.200, where V2 is an Abbe number of the second lens element, V5 is an Abbe number of the fifth lens element, V7 is an Abbe number of the seventh lens element, and V8 is an Abbe number of the eighth lens element.

According to an embodiment of the disclosure, an optical imaging lens includes a first lens element, a second lens element, a third lens element, a fourth lens element, a fifth lens element, a sixth lens element, a seventh lens element, and an eighth lens element sequentially arranged along an optical axis from an object side to an image side. Each of the first lens element to the eighth lens element includes an object-side surface facing the object side and allowing an imaging ray to pass through and an image-side surface facing the image side and allowing the imaging ray to pass through. The first lens element has positive refracting power. The third lens element has positive refracting power. A periphery region of the image-side surface of the third lens element is concave. An optical axis region of the image-side surface of the fifth lens element is concave. An optical axis region of the image-side surface of the sixth lens element is convex. A periphery region of the image-side surface of the seventh lens element is convex. A periphery region of the object-side surface of the eighth lens element is convex. Lens elements of the optical imaging lens are only the eight lens elements, and the optical imaging lens satisfies (V2+V5+V7)/V8≥2.200, where V2 is an Abbe number of the second lens element, V5 is an Abbe number of the fifth lens element, V7 is an Abbe number of the seventh lens element, and V8 is an Abbe number of the eighth lens element.

Based on the foregoing, by satisfying the above designs of the number of lens elements, the surface shape of the lens elements, and the refracting powers, and by satisfying the above conditions, the optical imaging lens of the embodiments of the disclosure has a larger aperture, a larger image height, and a higher resolution, and has favorable imaging quality.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 8 shows detailed optical data of the optical imaging lens of the first embodiment of the disclosure.

FIG. 9 shows aspheric parameters of the optical imaging lens of the first embodiment of the disclosure.

FIG. 12 shows detailed optical data of the optical imaging lens of the second embodiment of the disclosure.

FIG. 13 shows aspheric parameters of the optical imaging lens of the second embodiment of the disclosure.

FIG. 14 is a schematic diagram of an optical imaging lens of a third embodiment of the disclosure.

FIG. 15A to FIG. 15D are diagrams of a longitudinal spherical aberration and various optical aberrations of the optical imaging lens of the third embodiment.

FIG. 16 shows detailed optical data of the optical imaging lens of the third embodiment of the disclosure.

FIG. 17 shows aspheric parameters of the optical imaging lens of the third embodiment of the disclosure.

FIG. 20 shows detailed optical data of the optical imaging lens of the fourth embodiment of the disclosure.

FIG. 21 shows aspheric parameters of the optical imaging lens of the fourth embodiment of the disclosure.

FIG. 22 is a schematic diagram of an optical imaging lens of a fifth embodiment of the disclosure.

FIG. 23A to FIG. 23D are diagrams of a longitudinal spherical aberration and various optical aberrations of the optical imaging lens of the fifth embodiment.

FIG. 24 shows detailed optical data of the optical imaging lens of the fifth embodiment of the disclosure.

FIG. 25 shows aspheric parameters of the optical imaging lens of the fifth embodiment of the disclosure.

FIG. 26 is a schematic diagram of an optical imaging lens of a sixth embodiment of the disclosure.

FIG. 27A to FIG. 27D are diagrams of a longitudinal spherical aberration and various optical aberrations of the optical imaging lens of the sixth embodiment.

FIG. 28 shows detailed optical data of the optical imaging lens of the sixth embodiment of the disclosure.

FIG. 29 shows aspheric parameters of the optical imaging lens of the sixth embodiment of the disclosure.

FIG. 30 is a schematic diagram of an optical imaging lens of a seventh embodiment of the disclosure.

FIG. 31A to FIG. 31D are diagrams of a longitudinal spherical aberration and various optical aberrations of the optical imaging lens of the seventh embodiment.

FIG. 32 shows detailed optical data of the optical imaging lens of the seventh embodiment of the disclosure.

FIG. 33 shows aspheric parameters of the optical imaging lens of the seventh embodiment of the disclosure.

FIG. 36 shows detailed optical data of the optical imaging lens of the eighth embodiment of the disclosure.

FIG. 37 shows aspheric parameters of the optical imaging lens of the eighth embodiment of the disclosure.

FIG. 38 and FIG. 39 shows values of important parameters and conditions thereof of the optical imaging lenses of the first to eighth embodiments of the disclosure.

DESCRIPTION OF THE EMBODIMENTS

The terms "optical axis region", "periphery region", "concave", and "convex" used in this specification and claims should be interpreted based on the definition listed in the specification by the principle of lexicographer.

Figure 1:
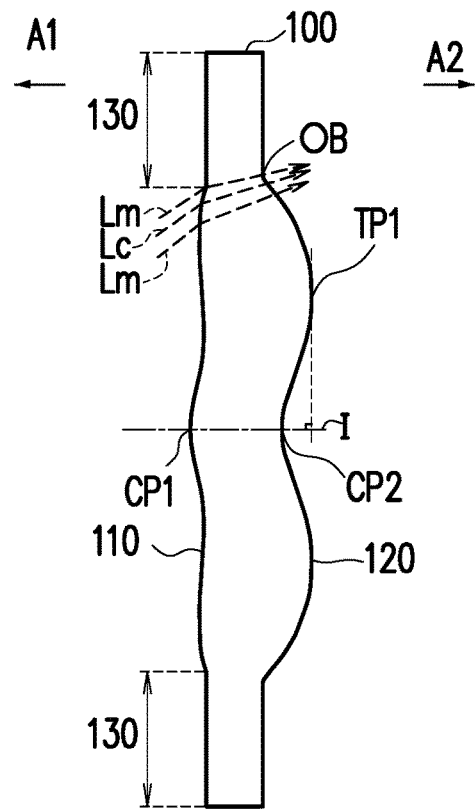
FIG. 1 is a schematic diagram showing a surface shape structure of a lens element.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
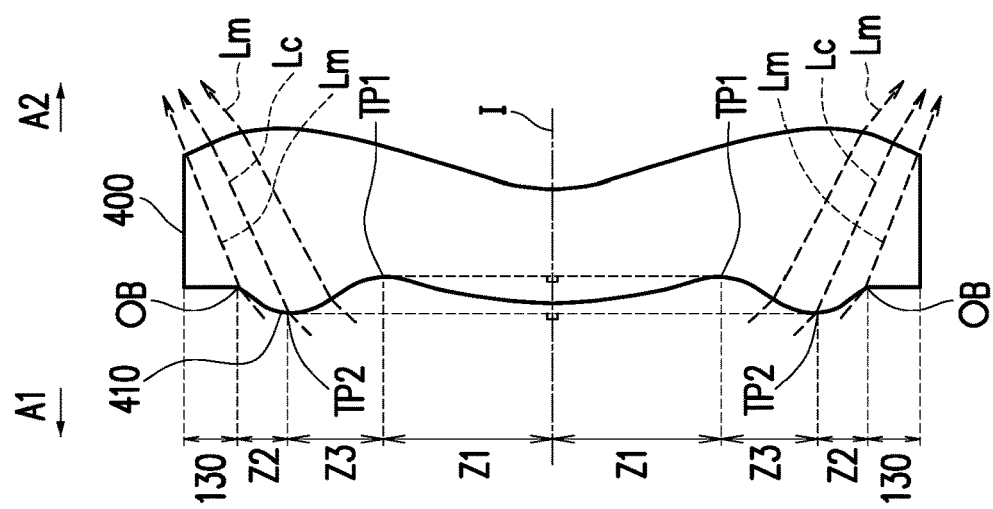
FIG. 4 is a schematic diagram showing a surface shape structure of a lens element of Example 2.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. A surface of the lens element 100 may have no transition point or have at least one transition point. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

When a surface of the lens element has at least one transition point, the region of the surface of the lens element from the central point to the first transition point TP1 is defined as the optical axis region, which includes the central point. The region located radially outside of the farthest transition point (the Nth transition point) from the optical axis I to the optical boundary OB of the surface of the lens element is defined as the periphery region. In some embodiments, there may be intermediate regions present between the optical axis region and the periphery region, with the number of intermediate regions depending on the number of the transition points. When a surface of the lens element has no transition point, the optical axis region is defined as a region of 0%-50% of the distance between the optical axis I and the optical boundary OB of the surface of the lens element, and the periphery region is defined as a region of 50%-100% of the distance between the optical axis I and the optical boundary OB of the surface of the lens element.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
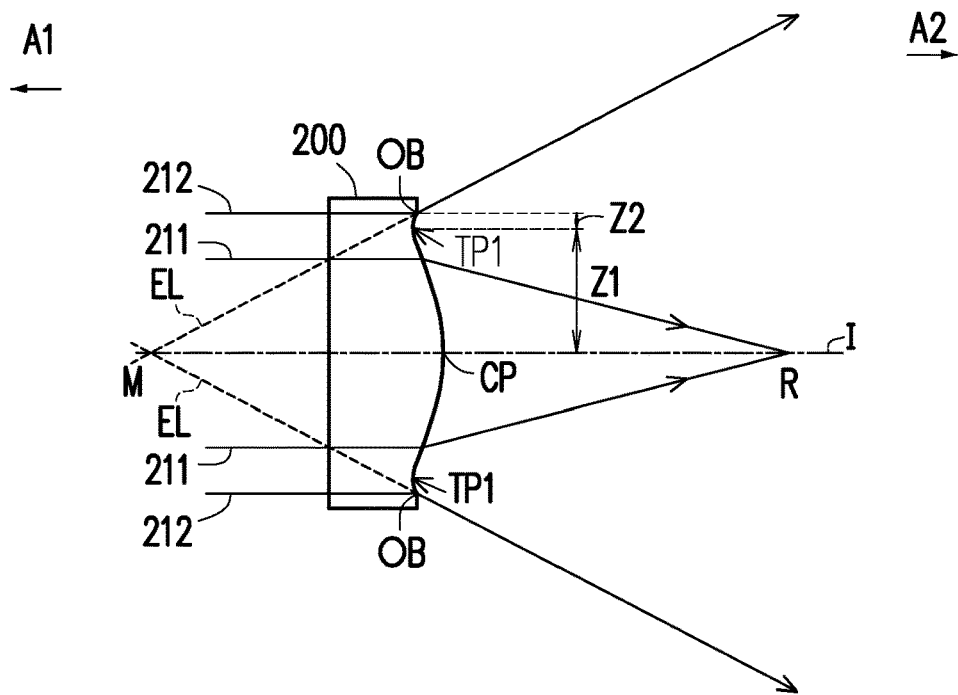
FIG. 2 is a schematic diagram showing a concave-convex structure and a point of intersection of rays of a lens element.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius of curvature" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex- (concave-) region," can be used alternatively.

Figure 5:
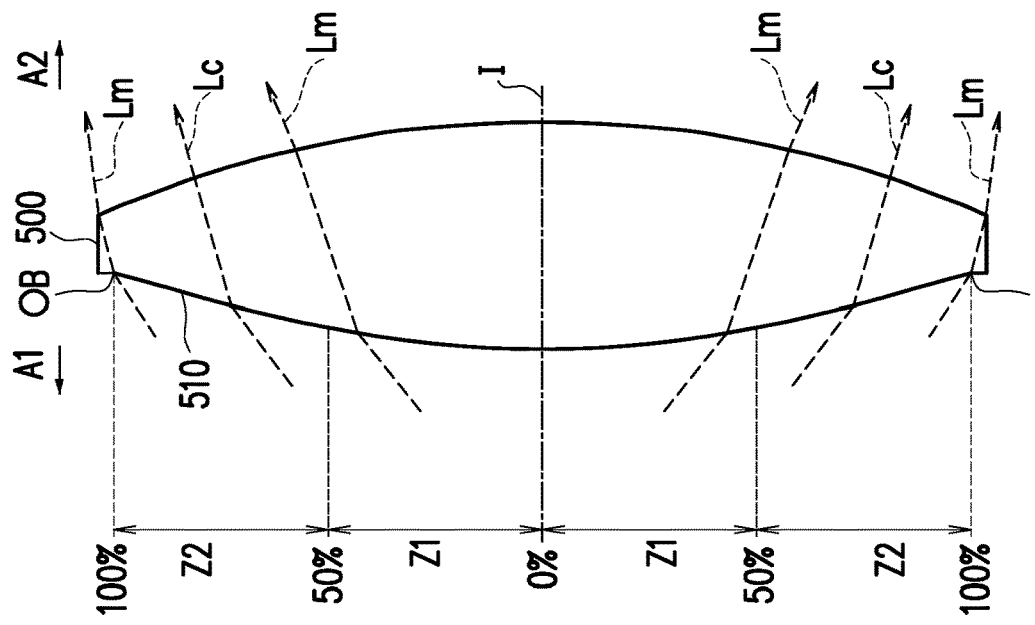
FIG. 5 is a schematic diagram showing a surface shape structure of a lens element of Example 3.
Figure 3:
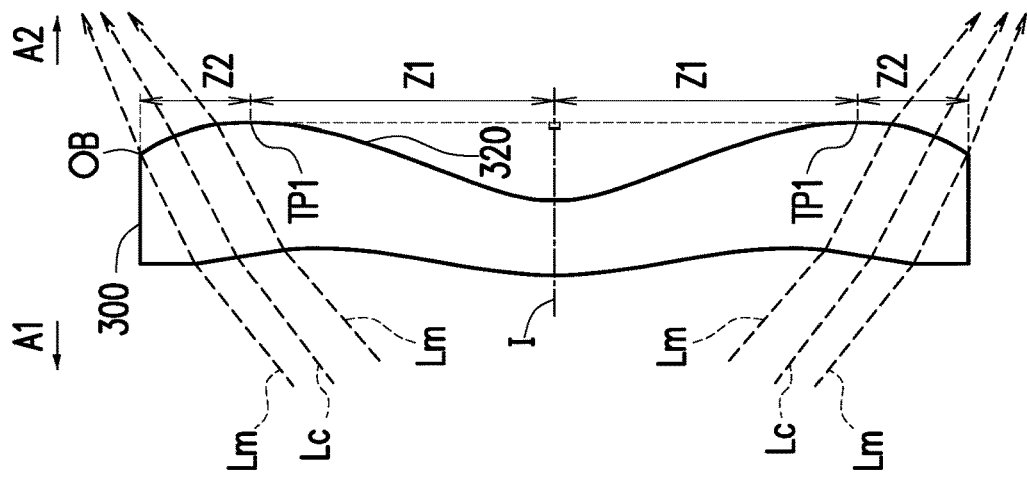
FIG. 3 is a schematic diagram showing a surface shape structure of a lens element of Example 1.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region of 0%-50% of the distance between the optical axis I and the optical boundary OB of the surface of the lens element and the periphery region is defined as the region of 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

Figure 6:
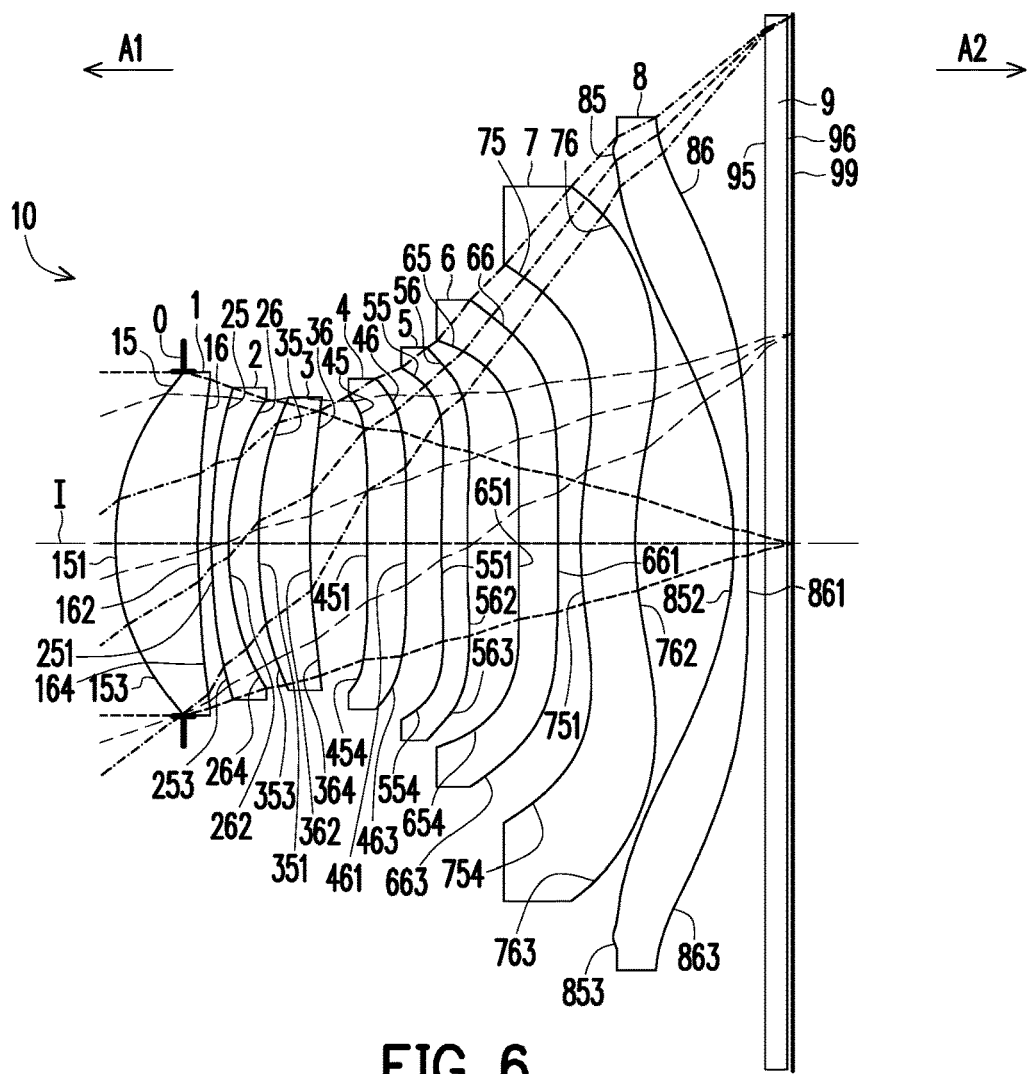
FIG. 6 is a schematic diagram of an optical imaging lens of a first embodiment of the disclosure.

FIG. 6 is a schematic diagram of an optical imaging lens of a first embodiment of the disclosure. FIG. 7A to FIG. 7D are diagrams of a longitudinal spherical aberration and various optical aberrations of the optical imaging lens of the first embodiment. First, referring to FIG. 6, an optical imaging lens 10 of the first embodiment of the disclosure includes an aperture 0, a first lens element 1, a second lens element 2, a third lens element 3, a fourth lens element 4, a fifth lens element 5, a sixth lens element 6, a seventh lens element 7, an eighth lens element 8, and a filter 9 sequentially arranged along the optical axis I of the optical imaging lens 10 from the object side A1 to the image side A2. When rays emitted by an object to be photographed enter the optical imaging lens 10, the rays may form an image on an image plane 99 after passing through the aperture 0, the first lens element 1, the second lens element 2, the third lens element 3, the fourth lens element 4, the fifth lens element 5, the sixth lens element 6, the seventh lens element 7, an eighth lens element 8, and the filter 9. In addition, the object side A1 is a side facing the object to be photographed, and the image side A2 is a side facing the image plane 99.

In this embodiment, the first lens element 1, the second lens element 2, the third lens element 3, the fourth lens element 4, the fifth lens element 5, the sixth lens element 6, the seventh lens element 7, the eighth lens element 8, and the filter 9 of the optical imaging lens 10 respectively have object-side surfaces 15, 25, 35, 45, 55, 65, 75, 85, 95 facing the object side A1 and allowing imaging rays to pass through and image-side surfaces 16, 26, 36, 46, 56, 66, 76, 86, 96 facing the image side A2 and allowing the imaging rays to pass through. In this embodiment, the aperture 0 is disposed on aside of the first lens element 1 facing the object side A1. The filter 9 is arranged between the image-side surface 86 of the eighth lens element 8 and the image plane 99. The filter 9 is an IR cut filter, which allows rays at other wavelengths to pass and blocks rays at an IR wavelength, but the disclosure is not limited thereto.

The first lens element 1 has positive refracting power. The material of the first lens element 1 is plastic, but the disclosure is not limited thereto. An optical axis region 151 of the object-side surface 15 of the first lens element 1 is convex, and a periphery region 153 thereof is convex. An optical axis region 162 of the image-side surface 16 of the first lens element 1 is concave, and a periphery region 164 thereof is concave. In this embodiment, both the object-side surface 15 and the image-side surface 16 of the first lens element 1 are aspheric surfaces.

The second lens element 2 has negative refracting power. The material of the second lens element 2 is plastic, but the disclosure is not limited thereto. An optical axis region 251 of the object-side surface 25 of the second lens element 2 is convex, and a periphery region 253 thereof is convex. An optical axis region 262 of the image-side surface 26 of the second lens element 2 is concave, and a periphery region 264 thereof is concave. In this embodiment, both the object-side surface 25 and the image-side surface 26 of the second lens element 2 are aspheric surfaces.

The third lens element 3 has positive refracting power. The material of the third lens element 3 is plastic, but the disclosure is not limited thereto. An optical axis region 351 of the object-side surface 35 of the third lens element 3 is convex, and a periphery region 353 thereof is convex. An optical axis region 362 of the image-side surface 36 of the third lens element 3 is concave, and a periphery region 364 thereof is concave. In this embodiment, both the object-side surface 35 and the image-side surface 36 of the third lens element 3 are aspheric surfaces.

The fourth lens element 4 has positive refracting power. The material of the fourth lens element 4 is plastic, but the disclosure is not limited thereto. An optical axis region 451 of the object-side surface 45 of the fourth lens element 4 is convex, and a periphery region 454 thereof is concave. An optical axis region 461 of the image-side surface 46 of the fourth lens element 4 is convex, and a periphery region 463 thereof is convex. In this embodiment, both the object-side surface 45 and the image-side surface 46 of the fourth lens element 4 are aspheric surfaces.

The fifth lens element 5 has positive refracting power. The material of the fifth lens element 5 is plastic, but the disclosure is not limited thereto. An optical axis region 551 of the object-side surface 55 of the fifth lens element 5 is convex, and a periphery region 554 thereof is concave. An optical axis region 562 of the image-side surface 56 of the fifth lens element 5 is concave, and a periphery region 563 thereof is convex. In this embodiment, both the object-side surface 55 and the image-side surface 56 of the fifth lens element 5 are aspheric surfaces.

The sixth lens element 6 has positive refracting power. The material of the sixth lens element 6 is plastic, but the disclosure is not limited thereto. An optical axis region 651 of the object-side surface 65 of the sixth lens element 6 is convex, and a periphery region 654 thereof is concave. An optical axis region 661 of the image-side surface 66 of the sixth lens element 6 is convex, and a periphery region 663 thereof is convex. In this embodiment, both the object-side surface 65 and the image-side surface 66 of the sixth lens element 6 are aspheric surfaces.

The seventh lens element 7 has negative refracting power. The material of the seventh lens element 7 is plastic, but the disclosure is not limited thereto. An optical axis region 751 of the object-side surface 75 of the seventh lens element 7 is convex, and a periphery region 754 thereof is concave. An optical axis region 762 of the image-side surface 76 of the seventh lens element 7 is concave, and a periphery region 763 thereof is convex. In this embodiment, both the object-side surface 75 and the image-side surface 76 of the seventh lens element 7 are aspheric surfaces.

The eighth lens element 8 has negative refracting power. The material of the eighth lens element 8 is plastic, but the disclosure is not limited thereto. An optical axis region 852 of the object-side surface 85 of the eighth lens element 8 is concave, and a periphery region 853 thereof is convex. An optical axis region 861 of the image-side surface 86 of the eighth lens element 8 is convex, and a periphery region 863 thereof is convex. In this embodiment, both the object-side surface 85 and the image-side surface 86 of the eighth lens element 8 are aspheric surfaces.

In this embodiment, lens elements of the optical imaging lens 10 are only eight lens elements, i.e., the first lens element 1, the second lens element 2, the third lens element 3, the fourth lens element 4, the fifth lens element 5, the sixth lens element 6, the seventh lens element 7, and the eighth lens element 8.

Other detailed optical data of the first embodiment are as shown in FIG. 8, and the optical imaging lens 10 of the first embodiment has an effective focal length (EFL) of 8.032 millimeters (mm), a half field of view (HFOV) of 37.312 degrees, a system length of 9.317 mm, an f-number (Fno) of 1.700, and an image height of 7.300 mm. The system length refers to a distance from the object-side surface 15 of the first lens element 1 to the image plane 99 on the optical axis I.

In addition, in this embodiment, the object-side surfaces 15, 25, 35, 45, 55, 65, 75, 85 and the image-side surfaces 16, 26, 36, 46, 56, 66, 76, 86 of the first lens element 1, the second lens element 2, the third lens element 3, the fourth lens element 4, the fifth lens element 5, the sixth lens element 6, the seventh lens element 7, and the eighth lens element 8 are all aspheric surfaces. These aspheric surfaces are defined according to Formula (1) below:

$$Z(Y) = \frac{Y^2}{R}/(1+\sqrt{1-(1+K)\frac{Y^2}{R^2}}) + \sum_{i=1}^{n} a_i \times Y^i \quad (1)$$

where

Y: a perpendicular distance between a point on an aspheric curve and the optical axis I;

Z: a depth of an aspheric surface (a perpendicular distance between a point on the aspheric surface that is spaced by the distance Y from the optical axis and a tangent plane tangent to a vertex of the aspheric surface on the optical axis I);

R: a radius of curvature at a position near the optical axis I on the surface of the lens element;

K: a conic constant; and $a_i$: an $i^{th}$-order aspheric coefficient.

The aspheric coefficients of the object-side surface 15 of the first lens element 1 to the image-side surface 86 of the eighth lens element 8 in Formula (1) are as shown in FIG. 9. Field number 15 in FIG. 9 denotes an aspheric coefficient of the object-side surface 15 of the first lens element 1, and the other fields may be deduced by analogy. In addition, in the table of FIG. 9 and the tables of the embodiments, unlisted odd-order aspheric coefficients (e.g., $a_1$, $a_3$, $a_5$, and $a_7$) and the second-order aspheric coefficient $a_2$ are all zero.

In addition, the relationships between important parameters in the optical imaging lens 10 of the first embodiment are as shown in FIG. 38, and the unit of the parameters from the row of BFL to the row of EPD in FIG. 38 is millimeter (mm), where T1 is a thickness of the first lens element 1 on the optical axis I;

T2 is a thickness of the second lens element 2 on the optical axis I;

T3 is a thickness of the third lens element 3 on the optical axis I;

T4 is a thickness of the fourth lens element 4 on the optical axis I;

T5 is a thickness of the fifth lens element 5 on the optical axis I;

T6 is a thickness of the sixth lens element 6 on the optical axis I;

T7 is a thickness of the seventh lens element 7 on the optical axis I;

T8 is a thickness of the eighth lens element 8 on the optical axis I;

G12 is an air gap between the first lens element 1 and the second lens element 2 on the optical axis I, i.e., a distance from the image-side surface 16 of the first lens element 1 to the object-side surface 25 of the second lens element 2 on the optical axis I;

G23 is an air gap between the second lens element 2 and the third lens element 3 on the optical axis I, i.e., a distance from the image-side surface 26 of the second lens element 2 to the object-side surface 35 of the third lens element 3 on the optical axis I;

G34 is an air gap between the third lens element 3 and the fourth lens element 4 on the optical axis I, i.e., a distance from the image-side surface 36 of the third lens element 3 to the object-side surface 45 of the fourth lens element 4 on the optical axis I;

G45 is an air gap between the fourth lens element 4 and the fifth lens element 5 on the optical axis I, i.e., a distance from the image-side surface 46 of the fourth lens element 4 to the object-side surface 55 of the fifth lens element 5 on the optical axis I;

G56 is an air gap between the fifth lens element 5 and the sixth lens element 6 on the optical axis I, i.e., a distance from the image-side surface 56 of the fifth lens element 5 to the object-side surface 65 of the sixth lens element 6 on the optical axis I;

G67 is an air gap between the sixth lens element 6 and the seventh lens element 7 on the optical axis I, i.e., a distance from the image-side surface 66 of the sixth lens element 6 to the object-side surface 75 of the seventh lens element 7 on the optical axis I;

G78 is an air gap between the seventh lens element 7 and the eighth lens element 8 on the optical axis I, i.e., a distance from the image-side surface 76 of the seventh lens element 7 to the object-side surface 85 of the eighth lens element 8 on the optical axis I;

AAG is a sum of the seven air gaps between the first lens element 1 to the eighth lens element 8 on the optical axis I, i.e., a sum of the air gaps G12, G23, G34, G45, G56, G67, and G78;

ALT is a sum of thicknesses of the eight lens elements from the first lens element 1 to the eighth lens element 8 on the optical axis I, i.e., a sum of the thicknesses T1, T2, T3, T4, T5, T6, T7, and T8;

TL is a distance from the object-side surface 15 of the first lens element 1 to the image-side surface 86 of the eighth lens element 8 on the optical axis I;

TTL is a distance from the object-side surface 15 of the first lens element 1 to the image plane 99 on the optical axis I;

BFL is a distance from the image-side surface 86 of the eighth lens element 8 to the image plane 99 on the optical axis I;

D11t22 is a distance from the object-side surface 15 of the first lens element 1 to the image-side surface 26 of the second lens element 2 on the optical axis, i.e., a sum of T1, G12, and T2;

D51t62 is a distance from the object-side surface 55 of the fifth lens element 5 to the image-side surface 66 of the sixth lens element 6 on the optical axis, i.e., a sum of T5, G56, and T6;

D72t82 is a distance from the image-side surface 76 of the seventh lens element 7 to the image-side surface 86 of the eighth lens element 8 on the optical axis, i.e., a sum of G78 and T8;

Fno is an f-number of the optical imaging lens 10;

EPD is an entrance pupil diameter of the optical imaging lens 10, i.e., the effective focal length of the optical imaging lens 10 divided by the f-number;

HFOV is a half field of view of the optical imaging lens 10;

ImgH is an image height of the optical imaging lens 10; and

EFL is an effective focal length of the optical imaging lens 10.

In addition, the following are further defined:

G8F is an air gap between the eighth lens element 8 and the filter 9 on the optical axis I, i.e., a distance from the image-side surface 86 of the eighth lens element 8 to the object-side surface 95 of the filter 9 on the optical axis I;

TF is a thickness of the filter 9 on the optical axis I;

GFP is an air gap between the filter 9 and the image plane 99 on the optical axis I, i.e., a distance from the image-side surface 96 of the filter 9 to the image plane 99 on the optical axis I;

f1 is a focal length of the first lens element 1;
f2 is a focal length of the second lens element 2;
f3 is a focal length of the third lens element 3;
f4 is a focal length of the fourth lens element 4;
f5 is a focal length of the fifth lens element 5;
f6 is a focal length of the sixth lens element 6;
f7 is a focal length of the seventh lens element 7;
f8 is a focal length of the eighth lens element 8;
n1 is a refractive index of the first lens element 1;
n2 is a refractive index of the second lens element 2;
n3 is a refractive index of the third lens element 3;
n4 is a refractive index of the fourth lens element 4;
n5 is a refractive index of the fifth lens element 5;
n6 is a refractive index of the sixth lens element 6;
n7 is a refractive index of the seventh lens element 7;
n8 is a refractive index of the eighth lens element 8;
V1 is an Abbe number of the first lens element 1;
V2 is an Abbe number of the second lens element 2;
V3 is an Abbe number of the third lens element 3;
V4 is an Abbe number of the fourth lens element 4;
V5 is an Abbe number of the fifth lens element 5;
V6 is an Abbe number of the sixth lens element 6;
V7 is an Abbe number of the seventh lens element 7; and
V8 is an Abbe number of the eighth lens element.

Figures 7A, 7B, 7C, 7D:
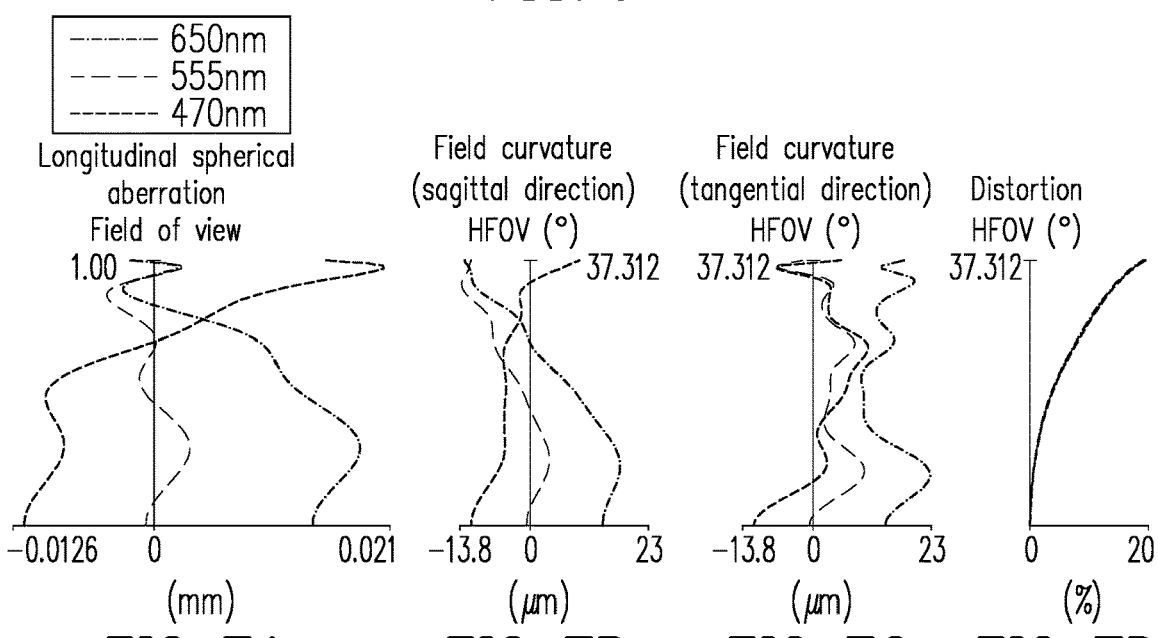
FIG. 7A to FIG. 7D are diagrams of a longitudinal spherical aberration and various optical aberrations of the optical imaging lens of the first embodiment.

Then, referring to FIG. 7A to FIG. 7D in conjunction, FIG. 7A is a diagram showing a longitudinal spherical aberration in the first embodiment, FIG. 7B and FIG. 7C respectively show a field curvature aberration in a sagittal direction and a field curvature aberration in a tangential direction on the image plane 99 at wavelengths of 470 nm, 555 nm, and 650 nm in the first embodiment, and FIG. 7D shows a distortion aberration on the image plane 99 at wavelengths of 470 nm, 555 nm, and 650 nm in the first embodiment. In FIG. 7A of the longitudinal spherical aberration of the first embodiment, curves formed by the wavelengths are very close to each other and are close to the middle, which indicates that off-axis rays at different heights at each wavelength are concentrated near an imaging point. It can be seen from the deflection amplitude of the curve at each wavelength that deviations of imaging points of the off-axis rays at different heights are controlled within a range of ±0.021 mm. Therefore, in the first embodiment, the spherical aberration of the same wavelength is obviously improved. In addition, distances between the three representative wavelengths are also quite close to each other, which indicates that imaging positions of rays at different wavelengths are quite concentrated, so the chromatic aberration is also obviously improved.

In the two field curvature aberration diagrams of FIG. 7B and FIG. 7C, field curvature optical aberrations of the three representative wavelengths within the entire field of view range fall within ±23.00 micrometers (μm), which indicates that the optical system of the first embodiment can effectively alleviate the optical aberrations. The distortion aberration diagram of FIG. 7D shows that the distortion aberration of the first embodiment is maintained within a range of ±20%, which indicates that the distortion aberration of the first embodiment meets the imaging quality requirements of the optical system. It is accordingly indicated that, compared with an existing optical lens, the optical imaging lens of the first embodiment can provide an f-number of 1.700 and an image height of 7.300 mm, and can still provide good imaging quality and chromatic aberration performance in a case where the system length is about 9.317 mm.

Figure 10:
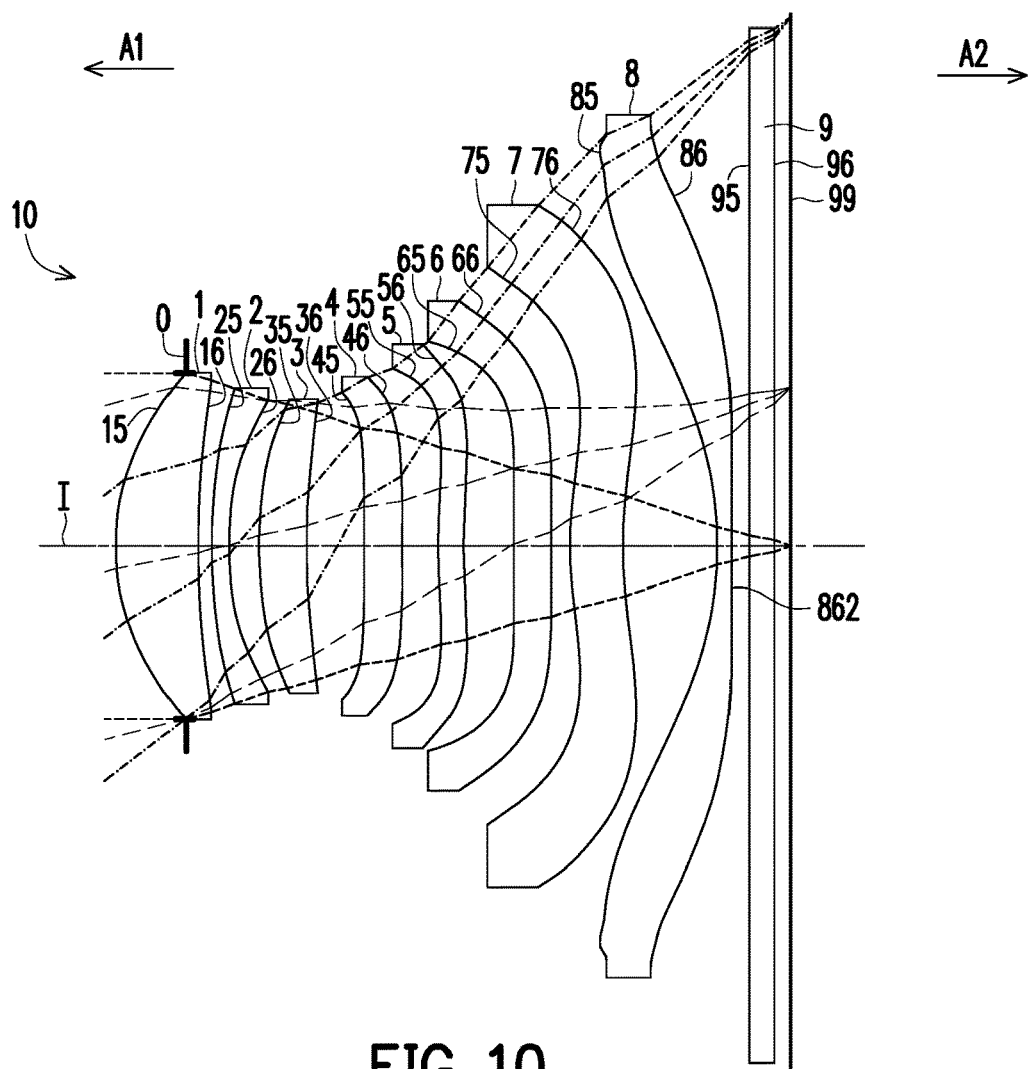
FIG. 10 is a schematic diagram of an optical imaging lens of a second embodiment of the disclosure.

FIG. 10 is a schematic diagram of an optical imaging lens of a second embodiment of the disclosure. FIG. 11A to FIG. 11D are diagrams of a longitudinal spherical aberration and various optical aberrations of the optical imaging lens of the second embodiment. First, referring to FIG. 10, the second embodiment of the optical imaging lens 10 of the disclosure is approximately similar to the first embodiment, and their differences are as follows: the optical data, aspheric coefficients, and parameters among the lens elements 1, 2, 3, 4, 5, 6, 7, and 8 are more or less different. In addition, in this embodiment, the fifth lens element 5 has negative refracting power, the seventh lens element 7 has positive refracting power, and an optical axis region 862 of the image-side surface 86 of the eighth lens element 8 is concave. It should be noted here that, in order to clearly show the figure, reference numerals of the optical axis regions and the periphery regions similar to those of the first embodiment are omitted in FIG. 10.

Detailed optical data of the optical imaging lens 10 of the second embodiment are as shown in FIG. 12, and the optical imaging lens 10 of the second embodiment has an effective focal length of 8.138 mm, a half field of view of 37.511 degrees, a system length of 9.323 mm, an f-number of 1.700, and an image height of 7.300 mm.

FIG. 13 shows the aspheric coefficients of the object-side surface 15 of the first lens element 1 to the image-side surface 86 of the eighth lens element 8 of the second embodiment in Formula (1).

In addition, the relationships between important parameters in the optical imaging lens 10 of the second embodiment are as shown in FIG. 38.

Figures 11A, 11B, 11C, 11D:
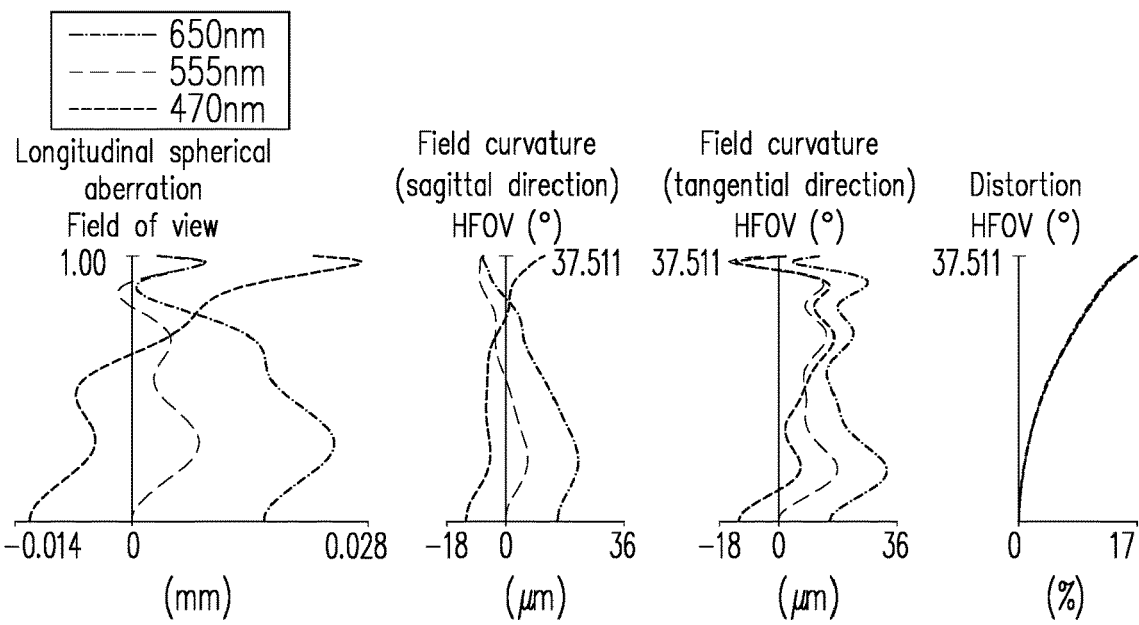
FIG. 11A to FIG. 11D are diagrams of a longitudinal spherical aberration and various optical aberrations of the optical imaging lens of the second embodiment.

In FIG. 11A of the longitudinal spherical aberration of the second embodiment, deviations of imaging points of the off-axis rays at different heights are controlled within a range of ±0.028 mm. In the two field curvature aberration diagrams of FIG. 11B and FIG. 11C, field curvature optical aberrations of the three representative wavelengths within the entire field of view range fall within ±36.00 μm. The distortion aberration diagram of FIG. 11D shows that the distortion aberration of the second embodiment is maintained within a range of ±17%. It is accordingly indicated that, compared with an existing optical lens, the second embodiment can provide an f-number of 1.700 and an image height of 7.300 mm, and can still provide good imaging quality and chromatic aberration performance in a case where the system length is about 9.323 mm.

From the above description, it can be known that the half field of view of the second embodiment is greater than that of the first embodiment, and the distortion aberration of the second embodiment is better than that of the first embodiment.

FIG. 14 is a schematic diagram of an optical imaging lens of a third embodiment of the disclosure. FIG. 15A to FIG. 15D are diagrams of a longitudinal spherical aberration and various optical aberrations of the optical imaging lens of the third embodiment. First, referring to FIG. 14, the third embodiment of the optical imaging lens 10 of the disclosure is approximately similar to the first embodiment, and their differences are as follows: the optical data, aspheric coefficients, and parameters among the lens elements 1, 2, 3, 4, 5, 6, 7, and 8 are more or less different. In addition, in this embodiment, the fourth lens element 4 has negative refracting power, the seventh lens element 7 has positive refracting power, an optical axis region 462 of the image-side surface 46 of the fourth lens element 4 is concave, an optical axis region 652 of the object-side surface 65 of the sixth lens element 6 is concave, and the optical axis region 862 of the image-side surface 86 of the eighth lens element 8 is concave. It should be noted here that, in order to clearly show the figure, reference numerals of the optical axis regions and the periphery regions similar to those of the first embodiment are omitted in FIG. 14.

Detailed optical data of the optical imaging lens 10 of the third embodiment are as shown in FIG. 16, and the optical imaging lens 10 of the third embodiment has an effective focal length of 8.466 mm, a half field of view of 38.451 degrees, a system length of 9.443 mm, an f-number of 1.800, and an image height of 7.300 mm.

FIG. 17 shows the aspheric coefficients of the object-side surface 15 of the first lens element 1 to the image-side surface 86 of the eighth lens element 8 of the third embodiment in Formula (1).

In addition, the relationships between important parameters in the optical imaging lens 10 of the third embodiment are as shown in FIG. 38.

In FIG. 15A of the longitudinal spherical aberration of the third embodiment, deviations of imaging points of the off-axis rays at different heights are controlled within a range of ±0.04 mm. In the two field curvature aberration diagrams of FIG. 15B and FIG. 15C, field curvature optical aberrations of the three representative wavelengths within the entire field of view range fall within ±0.04 mm. The distortion aberration diagram of FIG. 15D shows that the distortion aberration of the third embodiment is maintained within a range of ±10%. It is accordingly indicated that, compared with an existing optical lens, the third embodiment can provide an f-number of 1.800 and an image height of 7.300 mm, and can still provide good imaging quality and chromatic aberration performance in a case where the system length is about 9.443 mm.

From the above description, it can be known that the half field of view of the third embodiment is greater than that of the first embodiment, and the distortion aberration of the third embodiment is better than that of the first embodiment. Moreover, the thickness difference between the optical axis region and the periphery region of the lens elements of the third embodiment is less than that of the first embodiment, which facilitates manufacturing and thus a higher yield.

Figure 18:
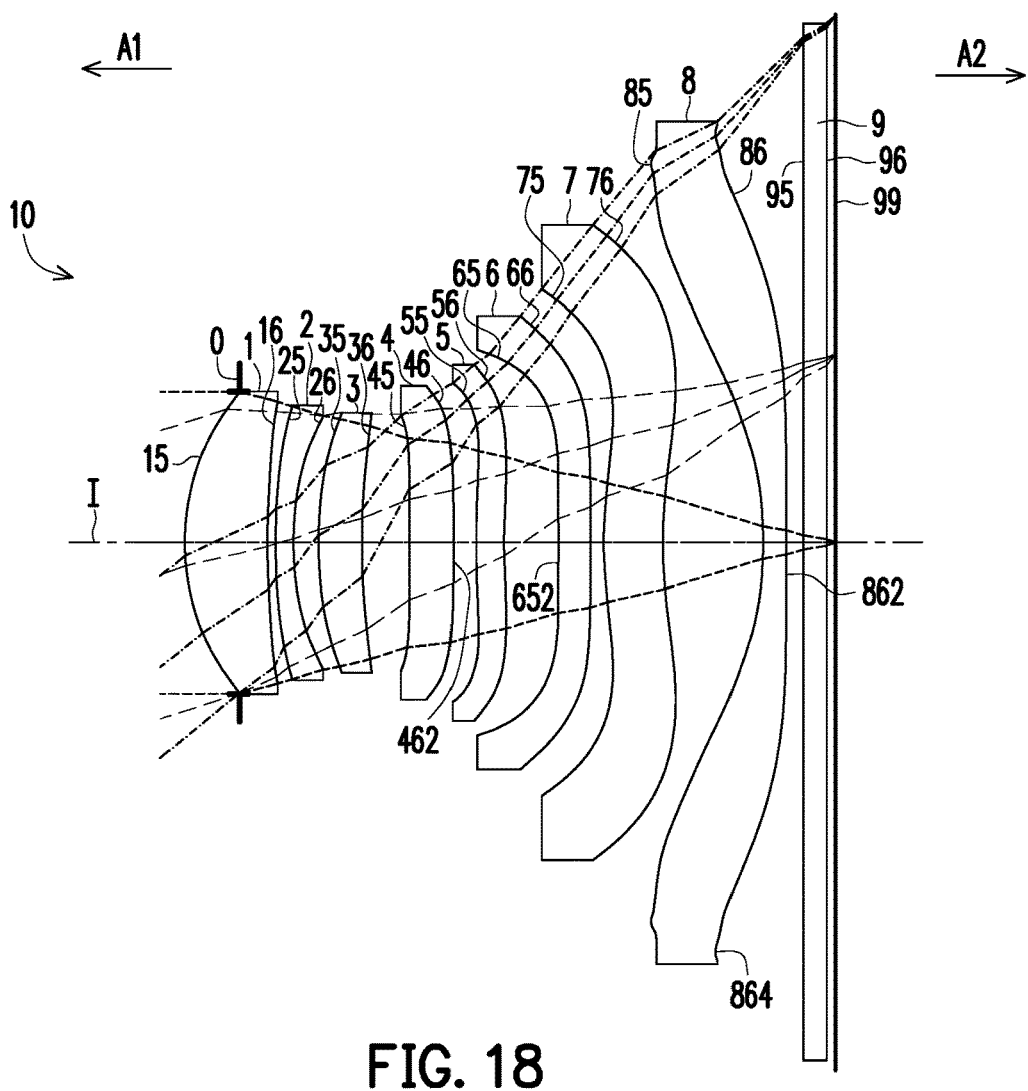
FIG. 18 is a schematic diagram of an optical imaging lens of a fourth embodiment of the disclosure.

FIG. 18 is a schematic diagram of an optical imaging lens of a fourth embodiment of the disclosure. FIG. 19A to FIG. 19D are diagrams of a longitudinal spherical aberration and various optical aberrations of the optical imaging lens of the fourth embodiment. First, referring to FIG. 18, the fourth embodiment of the optical imaging lens 10 of the disclosure is approximately similar to the first embodiment, and their differences are as follows: the optical data, aspheric coefficients, and parameters among the lens elements 1, 2, 3, 4, 5, 6, 7, and 8 are more or less different. In addition, in this embodiment, the sixth lens element 6 has negative refracting power, the seventh lens element 7 has positive refracting power, the optical axis region 462 of the image-side surface 46 of the fourth lens element 4 is concave, the optical axis region 652 of the object-side surface 65 of the sixth lens element 6 is concave, the optical axis region 862 of the image-side surface 86 of the eighth lens element 8 is concave, and a periphery region 864 of the image-side surface 86 of the eighth lens element 8 is concave. It should be noted here that, in order to clearly show the figure, reference numerals of the optical axis regions and the periphery regions similar to those of the first embodiment are omitted in FIG. 18.

Detailed optical data of the optical imaging lens 10 of the fourth embodiment are as shown in FIG. 20, and the optical imaging lens 10 of the fourth embodiment has an effective focal length of 8.023 mm, a half field of view of 39.293 degrees, a system length of 9.329 mm, an f-number of 1.850, and an image height of 7.571 mm.

FIG. 21 shows the aspheric coefficients of the object-side surface 15 of the first lens element 1 to the image-side surface 86 of the eighth lens element 8 of the fourth embodiment in Formula (1).

In addition, the relationships between important parameters in the optical imaging lens 10 of the fourth embodiment are as shown in FIG. 38.

Figures 19A, 19B, 19C, 19D:
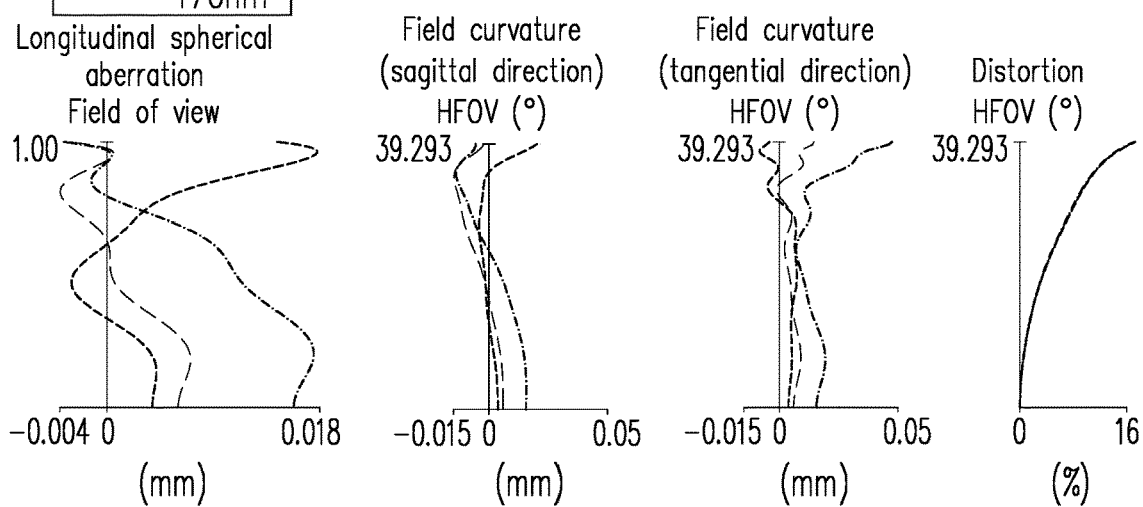
FIG. 19A to FIG. 19D are diagrams of a longitudinal spherical aberration and various optical aberrations of the optical imaging lens of the fourth embodiment.

In FIG. 19A of the longitudinal spherical aberration of the fourth embodiment, deviations of imaging points of the off-axis rays at different heights are controlled within a range of ±0.018 mm. In the two field curvature aberration diagrams of FIG. 19B and FIG. 15C, field curvature optical aberrations of the three representative wavelengths within the entire field of view range fall within ±0.05 mm. The distortion aberration diagram of FIG. 19D shows that the distortion aberration of the fourth embodiment is maintained within a range of ±16%. It is accordingly indicated that, compared with an existing optical lens, the fourth embodiment can provide an f-number of 1.850 and an image height of 7.571 mm, and can still provide good imaging quality and chromatic aberration performance in a case where the system length is about 9.329 mm.

From the above description, it can be known that the half field of view of the fourth embodiment is greater than that of the first embodiment, the image height of the fourth embodiment is greater than that of the first embodiment, and the distortion and longitudinal aberrations of the fourth embodiment are better than those of the first embodiment. Moreover, the thickness difference between the optical axis region and the periphery region of the lens elements of the fourth embodiment is less than that of the first embodiment, which facilitates manufacturing and thus a higher yield.

FIG. 22 is a schematic diagram of an optical imaging lens of a fifth embodiment of the disclosure. FIG. 23A to FIG. 23D are diagrams of a longitudinal spherical aberration and various optical aberrations of the optical imaging lens of the fifth embodiment. First, referring to FIG. 22, the fifth embodiment of the optical imaging lens 10 of the disclosure is approximately similar to the first embodiment, and their differences are as follows: the optical data, aspheric coefficients, and parameters among the lens elements 1, 2, 3, 4, 5, 6, 7, and 8 are more or less different. In addition, in this embodiment, the fourth lens element 4 has negative refracting power, the seventh lens element 7 has positive refracting power, the optical axis region 462 of the image-side surface 46 of the fourth lens element 4 is concave, the optical axis region 652 of the object-side surface 65 of the sixth lens element 6 is concave, the optical axis region 862 of the image-side surface 86 of the eighth lens element 8 is concave, and the periphery region 864 of the image-side surface 86 of the eighth lens element 8 is concave. It should be noted here that, in order to clearly show the figure, reference numerals of the optical axis regions and the periphery regions similar to those of the first embodiment are omitted in FIG. 22.

Detailed optical data of the optical imaging lens 10 of the fifth embodiment are as shown in FIG. 24, and the optical imaging lens 10 of the fifth embodiment has an effective focal length of 8.919 mm, a half field of view of 39.139 degrees, a system length of 9.490 mm, an f-number of 1.700, and an image height of 7.459 mm.

FIG. 25 shows the aspheric coefficients of the object-side surface 15 of the first lens element 1 to the image-side surface 86 of the eighth lens element 8 of the fifth embodiment in Formula (1).

In addition, the relationships between important parameters in the optical imaging lens 10 of the fifth embodiment are as shown in FIG. 39.

In FIG. 23A of the longitudinal spherical aberration of the fifth embodiment, deviations of imaging points of the off-axis rays at different heights are controlled within a range of ±0.13 mm. In the two field curvature aberration diagrams of FIG. 23B and FIG. 23C, field curvature optical aberrations of the three representative wavelengths within the entire field of view range fall within ±0.162 mm. The distortion aberration diagram of FIG. 23D shows that the distortion aberration of the fifth embodiment is maintained within a range of ±6.5%. It is accordingly indicated that, compared with an existing optical lens, the fifth embodiment can provide an f-number of 1.700 and an image height of 7.459 mm, and can still provide good imaging quality and chromatic aberration performance in a case where the system length is about 9.490 mm.

From the above description, it can be known that the half field of view of the fifth embodiment is greater than that of the first embodiment, the image height of the fifth embodiment is greater than that of the first embodiment, and the distortion aberration of the fifth embodiment is better than that of the first embodiment. Moreover, the thickness difference between the optical axis region and the periphery region of the lens elements of the fifth embodiment is less than that of the first embodiment, which facilitates manufacturing and thus a higher yield.

FIG. 26 is a schematic diagram of an optical imaging lens of a sixth embodiment of the disclosure. FIG. 27A to FIG. 27D are diagrams of a longitudinal spherical aberration and various optical aberrations of the optical imaging lens of the sixth embodiment. First, referring to FIG. 26, the sixth embodiment of the optical imaging lens 10 of the disclosure is approximately similar to the first embodiment, and their differences are as follows: the optical data, aspheric coefficients, and parameters among the lens elements 1, 2, 3, 4, 5, 6, 7, and 8 are more or less different. In addition, in this embodiment, the fifth lens element 5 has negative refracting power, the seventh lens element 7 has positive refracting power, the optical axis region 652 of the object-side surface 65 of the sixth lens element 6 is concave, and the optical axis region 862 of the image-side surface 86 of the eighth lens element 8 is concave. It should be noted here that, in order to clearly show the figure, reference numerals of the optical axis regions and the periphery regions similar to those of the first embodiment are omitted in FIG. 26.

Detailed optical data of the optical imaging lens 10 of the sixth embodiment are as shown in FIG. 28, and the optical imaging lens 10 of the sixth embodiment has an effective focal length of 7.921 mm, a half field of view of 37.511 degrees, a system length of 9.319 mm, an f-number of 1.700, and an image height of 7.300 mm.

FIG. 29 shows the aspheric coefficients of the object-side surface 15 of the first lens element 1 to the image-side surface 86 of the eighth lens element 8 of the sixth embodiment in Formula (1).

In addition, the relationships between important parameters in the optical imaging lens 10 of the sixth embodiment are as shown in FIG. 39.

In FIG. 27A of the longitudinal spherical aberration of the sixth embodiment, deviations of imaging points of the off-axis rays at different heights are controlled within a range of ±0.15 mm. In the two field curvature aberration diagrams of FIG. 27B and FIG. 27C, field curvature optical aberrations of the three representative wavelengths within the entire field of view range fall within ±0.20 mm. The distortion aberration diagram of FIG. 27D shows that the distortion aberration of the sixth embodiment is maintained within a range of ±19%. It is accordingly indicated that, compared with an existing optical lens, the sixth embodiment can provide an f-number of 1.700 and an image height of 7.300 mm, and can still provide good imaging quality and chromatic aberration performance in a case where the system length is about 9.319 mm.

From the above description, it can be known that the half field of view of the sixth embodiment is greater than that of the first embodiment, and the distortion aberration of the sixth embodiment is better than that of the first embodiment. Moreover, the thickness difference between the optical axis region and the periphery region of the lens elements of the sixth embodiment is less than that of the first embodiment, which facilitates manufacturing and thus a higher yield.

FIG. 30 is a schematic diagram of an optical imaging lens of a seventh embodiment of the disclosure. FIG. 31A to FIG.

31D are diagrams of a longitudinal spherical aberration and various optical aberrations of the optical imaging lens of the seventh embodiment. First, referring to FIG. 30, the seventh embodiment of the optical imaging lens 10 of the disclosure is approximately similar to the first embodiment, and their differences are as follows: the optical data, aspheric coefficients, and parameters among the lens elements 1, 2, 3, 4, 5, 6, 7, and 8 are more or less different. In addition, in this embodiment, the fourth lens element 4 has negative refracting power, the seventh lens element 7 has positive refracting power, the optical axis region 462 of the image-side surface 46 of the fourth lens element 4 is concave, the optical axis region 652 of the object-side surface 65 of the sixth lens element 6 is concave, and the optical axis region 862 of the image-side surface 86 of the eighth lens element 8 is concave. It should be noted here that, in order to clearly show the figure, reference numerals of the optical axis regions and the periphery regions similar to those of the first embodiment are omitted in FIG. 30.

Detailed optical data of the optical imaging lens 10 of the seventh embodiment are as shown in FIG. 32, and the optical imaging lens 10 of the seventh embodiment has an effective focal length of 7.215 mm, a half field of view of 38.967 degrees, a system length of 8.936 mm, an f-number of 1.800, and an image height of 7.189 mm.

FIG. 33 shows the aspheric coefficients of the object-side surface 15 of the first lens element 1 to the image-side surface 86 of the eighth lens element 8 of the seventh embodiment in Formula (1).

In addition, the relationships between important parameters in the optical imaging lens 10 of the seventh embodiment are as shown in FIG. 39.

From the above description, it can be known that the system length of the seventh embodiment is shorter than that of the first embodiment, the half field of view of the seventh embodiment is greater than that of the first embodiment, and the distortion aberration of the seventh embodiment is better than that of the first embodiment. Moreover, the thickness difference between the optical axis region and the periphery region of the lens elements of the seventh embodiment is less than that of the first embodiment, which facilitates manufacturing and thus a higher yield.

In FIG. 31A of the longitudinal spherical aberration of the seventh embodiment, deviations of imaging points of the off-axis rays at different heights are controlled within a range of ±0.24 mm. In the two field curvature aberration diagrams of FIG. 31B and FIG. 31C, field curvature optical aberrations of the three representative wavelengths within the entire field of view range fall within ±0.26 mm. The distortion aberration diagram of FIG. 31D shows that the distortion aberration of the seventh embodiment is maintained within a range of ±18%. It is accordingly indicated that, compared with an existing optical lens, the seventh embodiment can provide an f-number of 1.800 and an image height of 7.189 mm, and can still provide good imaging quality and chromatic aberration performance in a case where the system length is about 8.936 mm.

Figure 34:
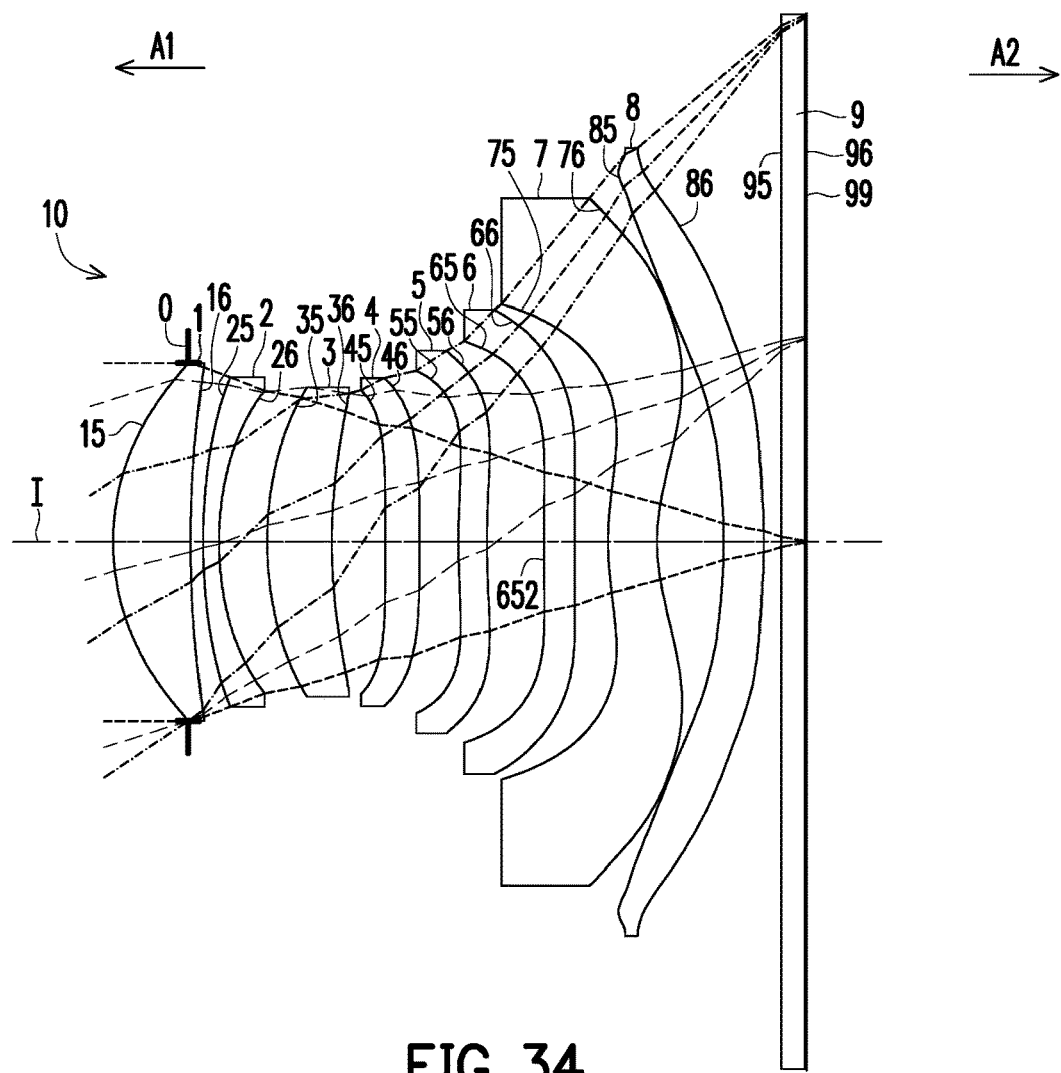
FIG. 34 is a schematic diagram of an optical imaging lens of an eighth embodiment of the disclosure.

FIG. 34 is a schematic diagram of an optical imaging lens of an eighth embodiment of the disclosure. FIG. 35A to FIG. 35D are diagrams of a longitudinal spherical aberration and various optical aberrations of the optical imaging lens of the eighth embodiment. First, referring to FIG. 34, the eighth embodiment of the optical imaging lens 10 of the disclosure is approximately similar to the first embodiment, and their differences are as follows: the optical data, aspheric coefficients, and parameters among the lens elements 1, 2, 3, 4, 5, 6, 7, and 8 are more or less different. In addition, in this embodiment, the sixth lens element 6 has negative refracting power, the eighth lens element 8 has positive refracting power, and the optical axis region 652 of the object-side surface 65 of the sixth lens element 6 is concave, It should be noted here that, in order to clearly show the figure, reference numerals of the optical axis regions and the periphery regions similar to those of the first embodiment are omitted in FIG. 34.

Detailed optical data of the optical imaging lens 10 of the eighth embodiment are as shown in FIG. 36, and the optical imaging lens 10 of the eighth embodiment has an effective focal length of 8.682 mm, a half field of view of 33.911 degrees, a system length of 9.878 mm, an f-number of 1.700, and an image height of 7.500 mm.

FIG. 37 shows the aspheric coefficients of the object-side surface 15 of the first lens element 1 to the image-side surface 86 of the eighth lens element 8 of the eighth embodiment in Formula (1).

In addition, the relationships between important parameters in the optical imaging lens 10 of the eighth embodiment are as shown in FIG. 39.

Figures 35A, 35B, 35C, 35D:
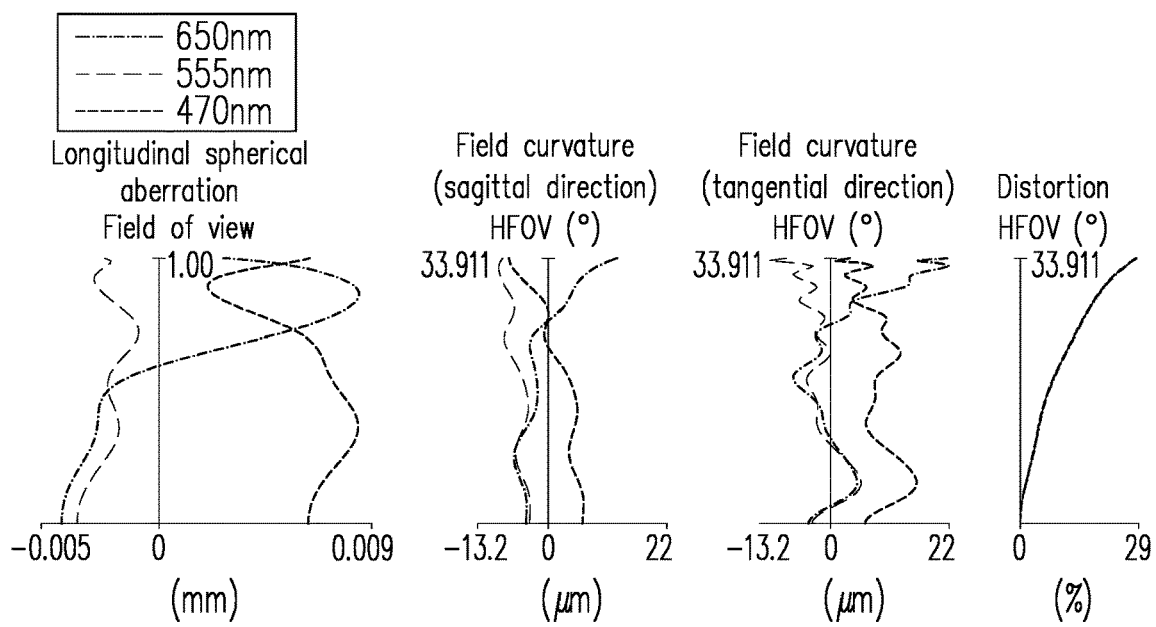
FIG. 35A to FIG. 35D are diagrams of a longitudinal spherical aberration and various optical aberrations of the optical imaging lens of the eighth embodiment.

In FIG. 35A of the longitudinal spherical aberration of the eighth embodiment, deviations of imaging points of the off-axis rays at different heights are controlled within a range of ±0.009 mm. In the two field curvature aberration diagrams of FIG. 35B and FIG. 35C, field curvature optical aberrations of the three representative wavelengths within the entire field of view range fall within ±22.00 µm. The distortion aberration diagram of FIG. 35D shows that the distortion aberration of the eighth embodiment is maintained within a range of ±29%. It is accordingly indicated that, compared with an existing optical lens, the eighth embodiment can provide an f-number of 1.700 and an image height of 7.500 mm, and can still provide good imaging quality and chromatic aberration performance in a case where the system length is about 9.878 mm.

From the above description, it can be known that the image height of the eighth embodiment is greater than that of the first embodiment, and the distortion and longitudinal aberrations of the eighth embodiment are better than those of the first embodiment. Moreover, the thickness difference between the optical axis region and the periphery region of the lens elements of the eighth embodiment is less than that of the first embodiment, which facilitates manufacturing and thus a higher yield.

By controlling the following optical properties and values of parameters of the lens elements, it is possible to assist the designer in designing an optical imaging lens that has a relatively large aperture, a relatively great image height, and a relatively high resolution, and is technically feasible.

In the embodiments of the disclosure, when the optical imaging lens satisfies that the first lens element has positive refracting power, the third lens element has positive refracting power, the periphery region of the image-side surface of the third lens element is concave, the optical axis region of the image-side surface of the fifth lens element is concave, the optical axis region of the image-side surface of the sixth lens element is convex, the periphery region of the object-side surface of the eighth lens element is convex, and $(V2+V5+V7)/V8 \geq 2.200$, it facilitates designing a lens having a large aperture and great image height. In addition, a preferable range is $2.200 \leq (V2+V5+V7)/V8 \leq 8.700$. The optical imaging lens may further satisfy that the periphery region of the object-side surface of the second lens element is convex, the periphery region of the object-side surface of the sixth lens element is concave, or the periphery region of the image-side surface of the seventh lens element is convex, to facilitate convergence and deflection of rays for calibration of the optical aberration of the outer field of view (0.6 to 1.0 field of view). The optical imaging lens may further satisfy that the second lens element has negative refracting power, to facilitate calibration of the optical aberration of the inner field of view (0.2 to 0.4 field of view).

In the embodiments of the disclosure, when the optical imaging lens satisfies that V2+V5≥55.000, V4+V7≤120.000, or V1+V4≤112.000, it facilitates an increase in the modulation transfer function (MTF) of the optical imaging lens to increase the resolution. A preferable range is 55.000≤V2+V5≤120.000, 38.000≤V4+V7≤120.000, or 38.000≤V1+V4≤112.000. A more preferable range is 55.000 V4+V7≤120.000 or 55.000 V1+V4≤112.000.

The optical imaging lens of the disclosure may further satisfy the following conditions, which facilitates maintaining the thicknesses of and intervals between the lens elements at an appropriate value in the case that a lens that has a large aperture and a great image height is provided, preventing any overly great parameter that adversely affects thinning of the overall optical imaging lens, or preventing any overly small parameter that affects assembling or raises difficulty in manufacturing:

Fno*TL/AAG≤4.100, and preferably 2.700≤Fno*TL/AAG≤4.100;

(T1+T2)/(G12+G23)≤3.100, and preferably 1.000≤(T1+T2)/(G12+G23)≤3.100;

(T1+G12+T2+BFL)/(G34+G67)≤3.310, and preferably 1.700≤(T1+G12+T2+BFL)/(G34+G67)≤3.310;

(T2+G78+T8)/T4≤5.300, and preferably 2.900 (T2+G78+T8)/T4≤5.300;

(T1+G78+T8)/T7≤4.900, and preferably 3.100 (T1+G78+T8)/T7≤4.900;

(T5+G78+T8)/(G34+G67)≤2.500, and preferably 0.800 (T5+G78+T8)/(G34+G67)≤2.500;

3.290≤(ImgH+EFL)/ALT, and preferably 3.290≤(ImgH+EFL)/ALT≤4.900;

4.400≤(ImgH+EPD)/(T1+T6+T8), and preferably ≤(ImgH+EPD)/(T1+T6+T8)≤7.600;

TTL/(G12+G23+G34+G67)≤7.000, and preferably 3.300≤TTL/(G12+G23+G34+G67)≤7.000;

(T6+G78+T8)/G67≤12.000, and preferably 1.100≤(T6+G78+T8)/G67≤12.000;

ALT/(G12+G23+G34+G45)≤3.200, and preferably 1.500≤ALT/(G12+G23+G34+G45)≤3.200;

Fno*(T5+G56+T6)/T4≤7.400, and preferably 4.400≤Fno*(T5+G56+T6)/T4≤7.400;

(T5+G56+T6+G78+T8)/G34≤6.000, and preferably 3.500≤(T5+G56+T6+G78+T8)/G34≤6.000; and Fno*(G45+T5+G56)/(G34+T4)≤3.400, and preferably 1.800≤Fno*(G45+T5+G56)/(G34+T4)≤3.400.

In addition, any combinational relationship between the parameters of the embodiments may be additionally selected to add limitations on lenses to facilitate design of lenses with the same structure of the disclosure.

In view of the unpredictability of optical system design, under the architecture of the disclosure, satisfying the above conditional expressions can better reduces the length, increase the available aperture size, improve the imaging quality, or improve the assembly yield rate of the lens of the disclosure over the prior art.

The exemplary limiting relational expressions listed above may also be arbitrarily and selectively combined in a certain quantity to be employed in the embodiments of the disclosure, and are not limited thereto. During implementation of the disclosure, in addition to the above relational expressions, more other detailed structures, such as arrangement of concave/convex curve surfaces, of lens elements may also be additionally designed for a single lens element or extensively for multiple lens elements to reinforce control over system performance and/or resolution. It should be noted that the details should be selectively combined and employed in other embodiments of the disclosure in a case without conflicts.

The contents in the embodiments of the invention include but are not limited to a focal length, a thickness of a lens element, an Abbe number, or other optical parameters. For example, in the embodiments of the invention, an optical parameter A and an optical parameter B are disclosed, wherein the ranges of the optical parameters, comparative relation between the optical parameters, and the range of a conditional expression covered by a plurality of embodiments are specifically explained as follows:

(1) The ranges of the optical parameters are, for example, $\alpha_2 \leq A \leq \alpha_1$ or $\beta_2 \leq B \leq \beta_1$, where $\alpha_1$ is a maximum value of the optical parameter A among the plurality of embodiments, $\alpha_2$ is a minimum value of the optical parameter A among the plurality of embodiments, $\beta_1$ is a maximum value of the optical parameter B among the plurality of embodiments, and $\beta_2$ is a minimum value of the optical parameter B among the plurality of embodiments.

(2) The comparative relation between the optical parameters is that A is greater than B or A is less than B, for example.

(3) The range of a conditional expression covered by a plurality of embodiments is in detail a combination relation or proportional relation obtained by a possible operation of a plurality of optical parameters in each same embodiment. The relation is defined as E, and E is, for example, A+B or A−B or A/B or A*B or $(A*B)^{1/2}$, and E satisfies a conditional expression $E \leq \gamma_1$ or $E \geq \gamma_2$ or $\gamma_2 \leq E \leq \gamma_1$, where each of $\gamma_1$ and $\gamma_2$ is a value obtained by an operation of the optical parameter A and the optical parameter B in a same embodiment, $\gamma_1$ is a maximum value among the plurality of the embodiments, and $\gamma_2$ is a minimum value among the plurality of the embodiments.

The ranges of the aforementioned optical parameters, the aforementioned comparative relations between the optical parameters, and a maximum value, a minimum value, and the numerical range between the maximum value and the minimum value of the aforementioned conditional expressions are all implementable and all belong to the scope disclosed by the invention. The aforementioned description is for exemplary explanation, but the invention is not limited thereto.

The embodiments of the invention are all implementable. In addition, a combination of partial features in a same embodiment can be selected, and the combination of partial features can achieve the unexpected result of the invention with respect to the prior art. The combination of partial features includes but is not limited to the surface shape of a lens element, a refracting power, a conditional expression or the like, or a combination thereof. The description of the embodiments is for explaining the specific embodiments of the principles of the invention, but the invention is not limited thereto. Specifically, the embodiments and the drawings are for exemplifying, but the invention is not limited thereto.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An optical imaging lens, comprising a first lens element, a second lens element, a third lens element, a fourth lens element, a fifth lens element, a sixth lens element, a seventh lens element, and an eighth lens element sequentially arranged along an optical axis from an object side to an image side, wherein each of the first lens element to the eighth lens element comprises an object-side surface facing the object side and allowing an imaging ray to pass through and an image-side surface facing the image side and allowing the imaging ray to pass through;

the first lens element has positive refracting power;
a periphery region of the object-side surface of the second lens element is convex;
the third lens element has positive refracting power and a periphery region of the image-side surface of the third lens element is concave;
an optical axis region of the image-side surface of the fifth lens element is concave;
an optical axis region of the image-side surface of the sixth lens element is convex; and
a periphery region of the object-side surface of the eighth lens element is convex,
wherein lens elements of the optical imaging lens are only the eight lens elements, and the optical imaging lens satisfies (V2+V5+V7)/V8≥2.200,
where V2 is an Abbe number of the second lens element, V5 is an Abbe number of the fifth lens element, V7 is an Abbe number of the seventh lens element, and V8 is an Abbe number of the eighth lens element.

2. The optical imaging lens according to claim 1, wherein the optical imaging lens further satisfies V2+V5≥55.000.

3. The optical imaging lens according to claim 1, wherein the optical imaging lens further satisfies Fno*TL/AAG≤4.100, where Fno is an f-number of the optical imaging lens, TL is a distance from the object-side surface of the first lens element to the image-side surface of the eighth lens element on the optical axis, and AAG is a sum of seven air gaps between the first lens element to the eighth lens element on the optical axis.

4. The optical imaging lens according to claim 1, wherein the optical imaging lens further satisfies (T2+G78+T8)/T4≤5.300, where T2 is a thickness of the second lens element on the optical axis, T4 is a thickness of the fourth lens element on the optical axis, T8 is a thickness of the eighth lens element on the optical axis, and G78 is an air gap between the seventh lens element and the eighth lens element on the optical axis.

5. The optical imaging lens according to claim 1, wherein the optical imaging lens further satisfies (ImgH+EFL)/ALT≥3.290, where ImgH is an image height of the optical imaging lens, EFL is an effective focal length of the optical imaging lens, and ALT is a sum of thicknesses of the eight lens elements from the first lens element to the eighth lens element on the optical axis.

6. The optical imaging lens according to claim 1, wherein the optical imaging lens further satisfies TTL/(G12+G23+G34+G67)≤7.000, where TTL is a distance from the object-side surface of the first lens element to an image plane on the optical axis, G12 is an air gap between the first lens element and the second lens element on the optical axis, G23 is an air gap between the second lens element and the third lens element on the optical axis, G34 is an air gap between the third lens element and the fourth lens element on the optical axis, and G67 is an air gap between the sixth lens element and the seventh lens element on the optical axis.

7. The optical imaging lens according to claim 1, wherein the optical imaging lens further satisfies Fno*(T5+G56+T6)/T4≤7.400, where Fno is an f-number of the optical imaging lens, T4 is a thickness of the fourth lens element on the optical axis, T5 is a thickness of the fifth lens element on the optical axis, T6 is a thickness of the sixth lens element on the optical axis, and G56 is an air gap between the fifth lens element and the sixth lens element on the optical axis.

8. An optical imaging lens, comprising a first lens element, a second lens element, a third lens element, a fourth lens element, a fifth lens element, a sixth lens element, a seventh lens element, and an eighth lens element sequentially arranged along an optical axis from an object side to an image side, wherein each of the first lens element to the eighth lens element comprises an object-side surface facing the object side and allowing an imaging ray to pass through and an image-side surface facing the image side and allowing the imaging ray to pass through;

the first lens element has positive refracting power;
the third lens element has positive refracting power and a periphery region of the image-side surface of the third lens element is concave;
an optical axis region of the image-side surface of the fifth lens element is concave;
a periphery region of the object-side surface of the sixth lens element is concave and an optical axis region of the image-side surface of the sixth lens element is convex; and
a periphery region of the object-side surface of the eighth lens element is convex,
wherein lens elements of the optical imaging lens are only the eight lens elements, and the optical imaging lens satisfies (V2+V5+V7)/V8≥2.200,
where V2 is an Abbe number of the second lens element, V5 is an Abbe number of the fifth lens element, V7 is an Abbe number of the seventh lens element, and V8 is an Abbe number of the eighth lens element.

9. The optical imaging lens according to claim 8, wherein the optical imaging lens further satisfies V4+V7≤120.000, where V4 is an Abbe number of the fourth lens element.

10. The optical imaging lens according to claim 8, wherein the optical imaging lens further satisfies (T1+T2)/(G12+G23)≤3.100, where T1 is a thickness of the first lens element on the optical axis, T2 is a thickness of the second lens element on the optical axis, G12 is an air gap between the first lens element and the second lens element on the optical axis, and G23 is an air gap between the second lens element and the third lens element on the optical axis.

11. The optical imaging lens according to claim 8, wherein the optical imaging lens further satisfies (T1+G78+T8)/T7≤4.900, where T1 is a thickness of the first lens element on the optical axis, T7 is a thickness of the seventh lens element on the optical axis, T8 is a thickness of the eighth lens element on the optical axis, and G78 is an air gap between the seventh lens element and the eighth lens element on the optical axis.

12. The optical imaging lens according to claim 8, wherein the optical imaging lens further satisfies (T6+G78+T8)/G67≤12.000, where T6 is a thickness of the sixth lens element on the optical axis, T8 is a thickness of the eighth lens element on the optical axis, G67 is an air gap between the sixth lens element and the seventh lens element on the optical axis, and G78 is an air gap between the seventh lens element and the eighth lens element on the optical axis.

13. The optical imaging lens according to claim 8, wherein the optical imaging lens further satisfies (ImgH+EPD)/(T1+T6+T8)≥4.400, where ImgH is an image height of the optical imaging lens, EPD is an entrance pupil diameter of the optical imaging lens, T1 is a thickness of the first lens element on the optical axis, T6 is a thickness of the sixth lens element on the optical axis, and T8 is a thickness of the eighth lens element on the optical axis.

14. The optical imaging lens according to claim 8, wherein the optical imaging lens further satisfies (T5+G56+T6+G78+T8)/G34≤6.000, where T5 is a thickness of the fifth lens element on the optical axis, T6 is a thickness of the sixth lens element on the optical axis, T8 is a thickness of the eighth lens element on the optical axis, G34 is an air gap between the third lens element and the fourth lens element on the optical axis, G56 is an air gap between the fifth lens element and the sixth lens element on the optical axis, and G78 is an air gap between the seventh lens element and the eighth lens element on the optical axis.

15. An optical imaging lens, comprising a first lens element, a second lens element, a third lens element, a fourth lens element, a fifth lens element, a sixth lens element, a seventh lens element, and an eighth lens element sequentially arranged along an optical axis from an object side to an image side, wherein each of the first lens element to the eighth lens element comprises an object-side surface facing the object side and allowing an imaging ray to pass through and an image-side surface facing the image side and allowing the imaging ray to pass through;
  the first lens element has positive refracting power;
  the third lens element has positive refracting power and a periphery region of the image-side surface of the third lens element is concave;
  an optical axis region of the image-side surface of the fifth lens element is concave;
  an optical axis region of the image-side surface of the sixth lens element is convex;
  a periphery region of the image-side surface of the seventh lens element is convex; and
  a periphery region of the object-side surface of the eighth lens element is convex,
  wherein lens elements of the optical imaging lens are only the eight lens elements, and the optical imaging lens satisfies (V2+V5+V7)/V8≥2.200,
  where V2 is an Abbe number of the second lens element, V5 is an Abbe number of the fifth lens element, V7 is an Abbe number of the seventh lens element, and V8 is an Abbe number of the eighth lens element.

16. The optical imaging lens according to claim 15, wherein the optical imaging lens further satisfies V1+V4≤112.000, where V1 is an Abbe number of the first lens element, and V4 is an Abbe number of the fourth lens element.

17. The optical imaging lens according to claim 15, wherein the optical imaging lens further satisfies (T1+G12+T2+BFL)/(G34+G67)≤3.310, where T1 is a thickness of the first lens element on the optical axis, T2 is a thickness of the second lens element on the optical axis, G12 is an air gap between the first lens element and the second lens element on the optical axis, G34 is an air gap between the third lens element and the fourth lens element on the optical axis, G67 is an air gap between the sixth lens element and the seventh lens element on the optical axis, and BFL is a distance from the image-side surface of the eighth lens element to an image plane on the optical axis.

18. The optical imaging lens according to claim 15, wherein the optical imaging lens further satisfies (T5+G78+T8)/(G34+G67)≤2.500, where T5 is a thickness of the fifth lens element on the optical axis, T8 is a thickness of the eighth lens element on the optical axis, G34 is an air gap between the third lens element and the fourth lens element on the optical axis, G67 is an air gap between the sixth lens element and the seventh lens element on the optical axis, and G78 is an air gap between the seventh lens element and the eighth lens element on the optical axis.

19. The optical imaging lens according to claim 15, wherein the optical imaging lens further satisfies ALT/(G12+G23+G34+G45)≤3.200, where ALT is a sum of thicknesses of the eight lens elements from the first lens element to the eighth lens element on the optical axis, G12 is an air gap between the first lens element and the second lens element on the optical axis, G23 is an air gap between the second lens element and the third lens element on the optical axis, G34 is an air gap between the third lens element and the fourth lens element on the optical axis, and G45 is an air gap between the fourth lens element and the fifth lens element on the optical axis.

20. The optical imaging lens according to claim 15, wherein the optical imaging lens further satisfies Fno*(G45+T5+G56)/(G34+T4)≤3.400, where Fno is an f-number of the optical imaging lens, T4 is a thickness of the fourth lens element on the optical axis, T5 is a thickness of the fifth lens element on the optical axis, G34 is an air gap between the third lens element and the fourth lens element on the optical axis, G45 is an air gap between the fourth lens element and the fifth lens element on the optical axis, and G56 is an air gap between the fifth lens element and the sixth lens element on the optical axis.

* * * * *